(12) United States Patent
Nakazato et al.

(10) Patent No.: US 11,061,189 B2
(45) Date of Patent: Jul. 13, 2021

(54) OPTICAL FIBER PROTECTION STRUCTURE AND METHOD OF MANUFACTURING OPTICAL ELEMENT

(71) Applicant: FUJIKURA LTD., Tokyo (JP)

(72) Inventors: Hiroto Nakazato, Sakura (JP); Tomoyuki Fujita, Sakura (JP); Kazuya Ishida, Sakura (JP)

(73) Assignee: FUJIKURA LTD., Tokyo (JP)

( * ) Notice: Subject to any disclaimer, the term of this patent is extended or adjusted under 35 U.S.C. 154(b) by 430 days.

(21) Appl. No.: 16/082,089

(22) PCT Filed: Feb. 21, 2017

(86) PCT No.: PCT/JP2017/006298
§ 371 (c)(1),
(2) Date: Sep. 4, 2018

(87) PCT Pub. No.: WO2017/179299
PCT Pub. Date: Oct. 19, 2017

(65) Prior Publication Data
US 2020/0292761 A1 Sep. 17, 2020

(30) Foreign Application Priority Data
Apr. 15, 2016 (JP) .............................. JP2016-082515

(51) Int. Cl.
*G02B 6/36* (2006.01)
*G02B 6/255* (2006.01)

(52) U.S. Cl.
CPC ......... *G02B 6/3636* (2013.01); *G02B 6/2558* (2013.01); *G02B 6/3652* (2013.01)

(58) Field of Classification Search
CPC .. G02B 6/3636; G02B 6/2558; G02B 6/3652; G02B 6/255
See application file for complete search history.

(56) References Cited

U.S. PATENT DOCUMENTS

2009/0074362 A1\* 3/2009 Oba .................... G02B 6/2558
385/96
2011/0110625 A1 5/2011 Chatigny

FOREIGN PATENT DOCUMENTS

CN 104965259 A 10/2015
JP 61-22004 U 2/1986
(Continued)

OTHER PUBLICATIONS

International Search Report dated May 23, 2017, issued in counterpart International Application No. PCT/JP2017/006298 (2 pages).
(Continued)

*Primary Examiner* — John Bedtelyon
(74) *Attorney, Agent, or Firm* — Westerman, Hattori, Daniels & Adrian, LLP

(57) ABSTRACT

There is provided an optical fiber protection structure capable of mitigating deterioration of optical characteristics of an optical fiber under a high-temperature environment and a method of manufacturing an optical element using the same. An optical combiner structure protects bare fiber exposure portions in which bare fibers are exposed from the coverings of optical fibers. The optical combiner structure has a fiber accommodation portion having a fiber accommodation groove that accommodates the bare fiber exposure portions therein, fixation resins filled within the fiber accommodation groove for fixing a portion of the coverings within the fiber accommodation groove, and seal resins for sealing spaces between the bare fibers and the coverings on ends of the bare fiber exposure portions. The seal resins are formed so as to be spaced from an inner surface of the fiber accommodation groove.

17 Claims, 18 Drawing Sheets

(56) References Cited

FOREIGN PATENT DOCUMENTS

| | | |
|---|---|---|
| JP | 5-224062 A | 9/1993 |
| JP | 5-264848 A | 10/1993 |
| JP | 8-122553 A | 5/1996 |
| JP | H09-211250 A | 8/1997 |
| JP | 2004-12608 A | 1/2004 |
| JP | 2005-202200 A | 7/2005 |
| JP | 2009-116076 A | 5/2009 |
| JP | 2014-139686 A | 7/2014 |

OTHER PUBLICATIONS

Supplementary European Search Report dated Nov. 15, 2019, issued in counterpart European patent application No. 17782117.0 (34 pages).

\* cited by examiner

SECTION B-B

SECTION G-G

OPTICAL FIBER PROTECTION STRUCTURE AND METHOD OF MANUFACTURING OPTICAL ELEMENT

TECHNICAL FIELD

The present invention relates to an optical fiber protection structure and a method of manufacturing an optical element, and more particularly to an optical fiber protection structure that receives at least a portion of an optical fiber therein and an optical combiner structure using the same.

BACKGROUND ART

For example, in many cases, optical fibers are connected to each other by removing coverings of the optical fibers and fusion-splicing bare fibers of the optical fibers to each other. Such portions of the optical fibers where the coverings have been removed are vulnerable to external forces and may be broken when any impact or vibration is exerted to those portions. In order to prevent such a problem, for example, an optical fiber protection structure as illustrated in Patent Literature 1 may be applied. FIG. 1 is a plan view showing an optical combiner structure 500 to which such a conventional optical fiber protection structure has been applied. As shown in FIG. 1, according to the optical combiner structure 500, a fusion splice portion 519 and bare fiber exposure portions 517 and 518 of optical fibers 511 and 512 are received within a fiber accommodation groove 521 of a fiber accommodation portion 520, which has a high tensile strength. With such a structure, those portions are protected from external forces such as impact or vibration.

However, portions 517A and 518A located between the bare fiber exposure portions 517, 518 and coverings 513, 514 are bared in the optical combiner structure 500. Therefore, moisture may be introduced from such portions 517A and 518A so that the coverings 513 and 514 swell so as to compress the optical fibers 511 and 512. In this case, the optical characteristics of the optical fibers, such as the beam quality and the numerical aperture, may be deteriorated.

In order to solve the aforementioned problems, for example, an optical fiber protection structure disclosed in Patent Literature 2 may be applied. FIG. 2 is a plan view showing an optical combiner structure 600 to which such a conventional optical fiber protection structure has been applied, and FIGS. 3 and 4 are cross-sectional views of the optical combiner structure 600 illustrated in FIG. 2, taken along line A-A. As shown in FIG. 2, the optical combiner structure 600 includes optical fibers 611 and 612 and a fiber accommodation portion 620 in which a fiber accommodation groove 621 is formed to receive a portion of the optical fibers 611 and 612.

As shown in FIGS. 2 to 4, in the optical combiner structure 600, resins 640A and 640B are filled into portions of the fiber accommodation groove 621 where a boundary portion 617A between a bare fiber exposure portion 617 and a covering 613 and a boundary portion 618A between a bare fiber exposure portion 618 and a covering 614 are respectively located. Thus, the boundary portions 617A and 618A between the bare fiber exposure portions 617, 618 and the coverings 613, 614 are sealed from an exterior of the boundary portions 617A and 618A. Therefore, according to the optical combiner structure 600, moisture is prevented from being introduced from those portions 617A and 618A. Generally, those resins 640A and 640B are formed of a material having a low refractive index in order to prevent light propagating through the optical fibers 611 and 612 from leaking into the structure 600. FIG. 3 shows a state in which the resin 640A has swelled, and FIG. 4 shows a state in which the resin 640A has shrunk.

Meanwhile, as shown in FIGS. 2 to 4, when the resins 640A and 640B are filled within the fiber accommodation groove 621, they are brought into contact with right and left inner surfaces (opposed inner surfaces in the Y-direction) and a lower inner surface (in the −Z-direction) of the fiber accommodation groove 621. In contrast, upper sides (in the +Z-direction) of the resins 640A and 640B are opened. When the resins 640A and 640B expand under a high-temperature environment, compressive stresses are applied to the optical fibers 611 and 612 from the right and left inner surfaces and the lower inner surface of the fiber accommodation groove 621 as indicated by arrows of FIG. 3. On the other hand, since the upper sides of the resins 640A and 640B are opened, compressive stresses applied downward are smaller than the aforementioned stresses from the right and left inner surfaces and the lower inner surface of the fiber accommodation groove 621. In other words, anisotropic compressive stresses are applied to the optical fibers 611 and 612 within the resins 640A and 640B due to expansion of the resins 640A and 640B. Therefore, microbend may be caused to the optical fibers 611 and 612. Accordingly, when the optical combiner structure 600 is applied, the optical characteristics of the optical fibers may problematically be deteriorated under a high-temperature environment.

Furthermore, when the resins 640A and 640B shrink by curing, tensile stresses are applied to the optical fibers 611 and 612 toward the right and left inner surfaces and the lower inner surface of the fiber accommodation groove 621 as indicated by arrows of FIG. 4. On the other hand, since the upper sides of the resins 640A and 640B are opened, tensile stresses applied upward are smaller than the aforementioned tensile stresses from the right and left inner surfaces and the lower inner surface of the fiber accommodation groove 621. In other words, anisotropic tensile stresses are applied to the optical fibers 611 and 612 within the resins 640A and 640B due to shrinkage of the resins 640A and 640B. Therefore, microbend may be caused to the optical fibers 611 and 612. Accordingly, when the optical combiner structure 600 is manufactured, the optical characteristics of the optical fibers may problematically be deteriorated.

In order to avoid the problem that the aforementioned anisotropic stresses may cause microbend to the optical fibers when the resins shrink by curing, the resins 640A and 640B may be formed of a material having a low rate of cure shrinkage to reduce the stresses. However, the number of currently available materials that have both properties of a low rate of cure shrinkage and a low refractive index are very small. Therefore, when the resins 640A and 640B are formed of a material having a low refractive index in order to prevent light propagating through the optical fibers 611 and 612 from leaking into the structure 600, then it is difficult to use a material having a low rate of cure shrinkage. In other words, the optical combiner structure 600 has difficulties in solving both of problems to prevent generation of microbend and leakage of light. In this aspect, the optical characteristics of the optical fibers may problematically be deteriorated.

PRIOR ART LITERATURE

Patent Literature

Patent Literature 1: JP 2009-116076 A
Patent Literature 2: JP 2005-202200 A

SUMMARY OF THE INVENTION

Problem(s) to be Solved by the Invention

The present invention has been made in view of the above drawbacks of the prior art. It is, therefore, a first object of the present invention is to provide an optical fiber protection structure capable of mitigating deterioration of optical characteristics of an optical fiber under a high-temperature environment.

Furthermore, a second object of the present invention is to provide a method of manufacturing an optical element that can avoid deterioration of optical characteristics.

Means for Solving Problem(s)

According to a first aspect of the present invention, there is provided an optical fiber protection structure capable of mitigating deterioration of optical characteristics of an optical fiber under a high-temperature environment. This optical fiber protection structure protects a bare fiber exposure portion in which a bare fiber is exposed from a covering of at least one optical fiber. The optical fiber protection structure has a fiber accommodation portion having a fiber accommodation groove that receives the bare fiber exposure portion therein, a fixation resin filled within the fiber accommodation groove for fixing a portion of the covering within the fiber accommodation groove, and two seal resins for sealing a space between the bare fiber and the covering on both ends of the bare fiber exposure portion. At least one of the two seal resins is formed so as to be spaced from an inner surface of the fiber accommodation groove.

With this configuration, since two seal resins seal a space between the bare fiber and the covering on both ends of the bare fiber exposure portion, moisture is prevented from being introduced into the optical fiber from between the bare fiber and the covering. Furthermore, since at least one of the two seal resins is formed so as to be spaced from the inner surface of the fiber accommodation groove, the seal resin can expand isotropically. Accordingly, microbend is prevented from being generated in the optical fiber under a high-temperature environment. As a result, deterioration of the optical characteristics of the optical fiber is mitigated under a high-temperature environment.

According to a second aspect of the present invention, there is provided an optical fiber protection structure capable of mitigating deterioration of optical characteristics of an optical fiber under a high-temperature environment. This optical fiber protection structure protects a bare fiber exposure portion in which a bare fiber is exposed from a covering of at least one optical fiber. The optical fiber protection structure has a fiber accommodation portion having a fiber accommodation groove that receives the bare fiber exposure portion therein, a fixation resin filled within the fiber accommodation groove for fixing a portion of the covering within the fiber accommodation groove, and a single seal resin for sealing a space between the bare fiber and the covering on both ends of the bare fiber exposure portion. The single seal resin is formed so as to be spaced from an inner surface of the fiber accommodation groove.

With this configuration, since a single seal resin seals a space between the bare fiber and the covering on both ends of the bare fiber exposure portion, moisture is prevented from being introduced into the optical fiber from between the bare fiber and the covering. Furthermore, since the single seal resin is formed so as to be spaced from the inner surface of the fiber accommodation groove, the seal resin can expand isotropically. Accordingly, microbend is prevented from being generated in the optical fiber under a high-temperature environment. As a result, deterioration of the optical characteristics of the optical fiber is mitigated under a high-temperature environment.

The seal resin may preferably have a refractive index lower than that of a cladding in the bare fiber. In this case, light propagating through the optical fiber is prevented from leaking out. Furthermore, the seal resin may have a thermal conductivity higher than those of a cladding in the bare fiber and the covering. In this case, heat generated by light propagating through the optical fiber is dissipated to an exterior of the optical combiner structure.

Furthermore, the optical fiber protection structure may further include a heat dissipation resin having a thermal conductivity higher than those of a cladding in the bare fiber and the covering. The heat dissipation resin may cover an outer circumference of the covering located within the fiber accommodation groove. The heat dissipation resin is formed so as to be spaced from the inner surface of the fiber accommodation groove. Thus, heat generated by light propagating through the optical fiber is dissipated to an exterior of the optical combiner structure. In order to enhance the conductivity of heat generated by light propagating through the optical fiber, at least a portion of the heat dissipation resin may preferably be in contact with the seal resin. Furthermore, in order to improve dissipation of heat thus transmitted, at least a portion of the heat dissipation resin may preferably be in contact with the fixation resin.

According to a third aspect of the present invention, there is provided a method that can manufacture an optical element while deterioration of optical characteristics is mitigated. This manufacturing method of an optical element is to manufacture an optical element using an optical fiber protection structure for protecting a bare fiber exposure portion in which a bare fiber is exposed from a covering of at least one optical fiber. According to the manufacturing method, two seal resins are first formed on both ends of the bare fiber exposure portion to seal a space between the bare fiber and the covering such that at least one of the two seal resins has such a thickness so as not to reach an inner surface of a fiber accommodation groove formed in a fiber accommodation portion when the bare fiber exposure portion is accommodated within the fiber accommodation groove. After the formation of the two seal resins, the bare fiber exposure portion is accommodated within the fiber accommodation groove of the fiber accommodation portion such that the at least one of the two seal resins is spaced from the inner surface of the fiber accommodation groove. Then a fixation resin is filled into the fiber accommodation groove to fix a portion of the covering accommodated in the fiber accommodation groove to the fiber accommodation groove to complete the optical element.

In this manufacturing method, two seal resins are formed before the optical fiber is accommodated in the fiber accommodation groove. When the two seal resins are formed, they can shrink isotropically. Therefore, microbend is prevented from being generated in the optical fiber during the manufacturing process. As a result, deterioration of the optical characteristics of the optical fiber is mitigated at the manufacturing stage. Furthermore, since the seal resins can thus shrink isotropically, generation of microbend is suppressed even if the seal resins are formed of a material having a high rate of cure shrinkage. Therefore, the seal resins can be formed of a material having a low refractive index.

According to a fourth aspect of the present invention, there is provided a method that can manufacture an optical element while deterioration of optical characteristics is mitigated. This manufacturing method of an optical element is to manufacture an optical element using an optical fiber protection structure for protecting a bare fiber exposure portion in which a bare fiber is exposed from a covering of at least one optical fiber. According to the manufacturing method, a single seal resin is first formed to seal a space between the bare fiber and the covering on both ends of the bare fiber exposure portion such that the single seal resin has such a thickness so as not to reach an inner surface of a fiber accommodation groove formed in a fiber accommodation portion when the bare fiber exposure portion is accommodated within the fiber accommodation groove. After the formation of the single seal resin, the bare fiber exposure portion is accommodated within the fiber accommodation groove of the fiber accommodation portion such that the single seal resin is spaced from the inner surface of the fiber accommodation groove. A fixation resin is filled into the fiber accommodation groove to fix a portion of the covering accommodated in the fiber accommodation groove to the fiber accommodation groove to complete the optical element.

In this manufacturing method, a single seal resin is formed before the optical fiber is accommodated in the fiber accommodation groove. When the single seal resin is formed, it can shrink isotropically. Therefore, microbend is prevented from being generated in the optical fiber during the manufacturing process. As a result, deterioration of the optical characteristics of the optical fiber is mitigated at the manufacturing stage. Furthermore, since the seal resin can thus shrink isotropically, generation of microbend is suppressed even if the seal resin is formed of a material having a high rate of cure shrinkage. Therefore, the seal resin can be formed of a material having a low refractive index.

Before the bare fiber exposure portion is accommodated within the fiber accommodation groove, a heat dissipation resin having a thermal conductivity higher than those of a cladding in the bare fiber and the covering may be formed on an outer circumference of the covering such that the heat dissipation resin has such a thickness so as not to reach the inner surface of the fiber accommodation groove when the bare fiber exposure portion is accommodated within the fiber accommodation groove. When the bare fiber exposure portion is accommodated within the fiber accommodation groove, the seal resin and the heat dissipation resin may be spaced from the inner surface of the fiber accommodation groove. This configuration can produce an optical element that can dissipate heat generated by light propagating through the optical fiber to an exterior of the optical combiner structure.

Advantageous Effects of the Invention

According to an optical fiber protection structure of the first aspect of the present invention, since at least one of the two seal resins is formed so as to be spaced from the inner surface of the fiber accommodation groove, the seal resin can expand isotropically. Therefore, microbend is prevented from being generated in the optical fiber under a high-temperature environment. As a result, deterioration of the optical characteristics of the optical fiber is mitigated under a high-temperature environment.

According to an optical fiber protection structure of the second aspect of the present invention, since the single seal resin is formed so as to be spaced from the inner surface of the fiber accommodation groove, the seal resin can expand isotropically. Therefore, microbend is prevented from being generated in the optical fiber under a high-temperature environment. As a result, deterioration of the optical characteristics of the optical fiber is mitigated under a high-temperature environment.

Furthermore, according to a manufacturing method of an optical element of the third aspect of the present invention, two seal resins can be formed before the optical fiber is accommodated in the fiber accommodation groove. Therefore, microbend is prevented from being generated in the optical fiber during the manufacturing process. As a result, deterioration of the optical characteristics of the optical fiber is mitigated at the manufacturing stage, and the seal resins can be formed of a material having a low refractive index.

Moreover, according to a manufacturing method of an optical element of the fourth aspect of the present invention, a single seal resin can be formed before the optical fiber is accommodated in the fiber accommodation groove. Therefore, microbend is prevented from being generated in the optical fiber during the manufacturing stage. As a result, deterioration of the optical characteristics of the optical fiber is mitigated at the manufacturing stage, and the seal resin can be formed of a material having a low refractive index.

MODE(S) FOR CARRYING OUT THE INVENTION

Figure 1:
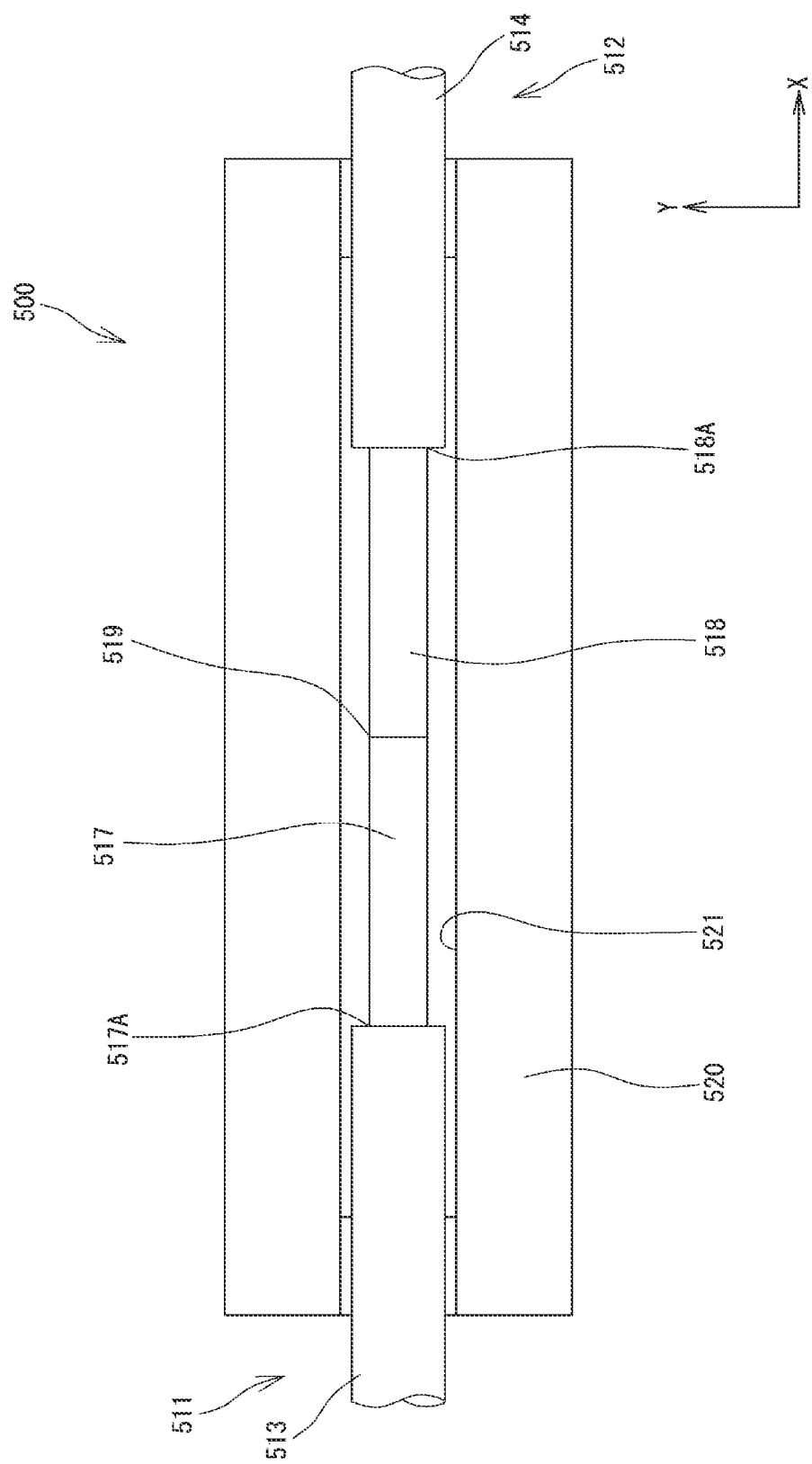
FIG. 1 is a plan view schematically showing a conventional optical fiber protection structure.
Figure 2:
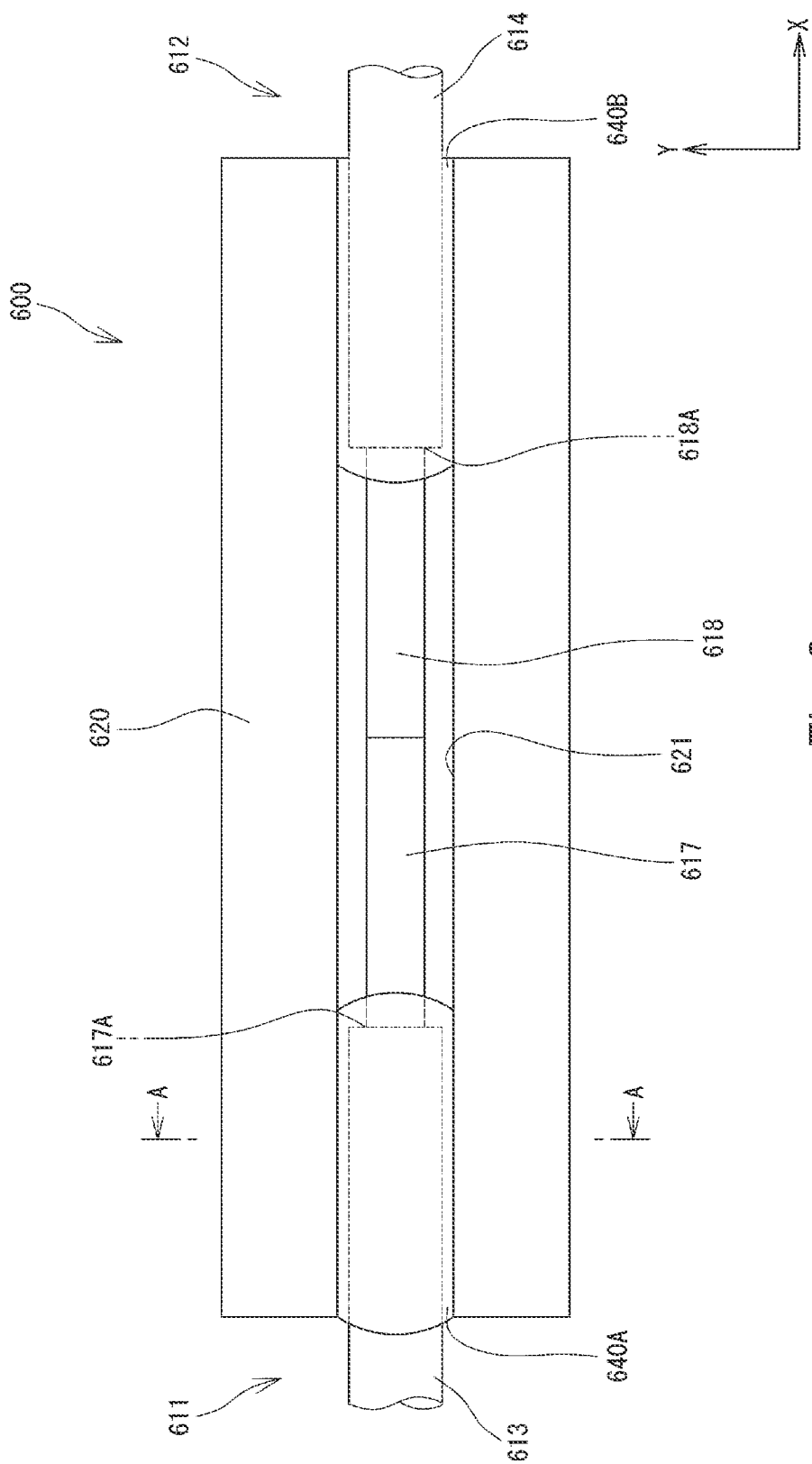
FIG. 2 is a plan view schematically showing a conventional optical fiber protection structure.
Figure 3:
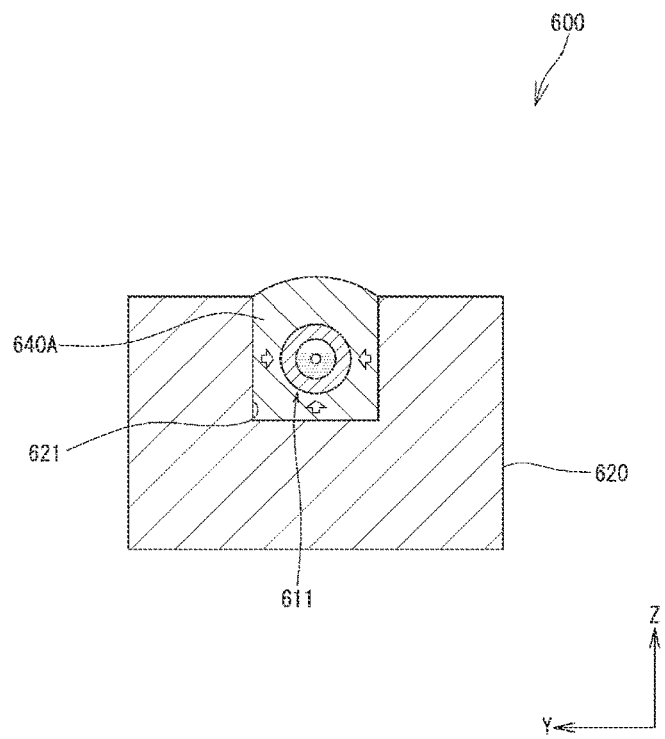
FIG. 3 is a cross-sectional view taken along line A-A of FIG. 2, schematically showing a state in which a resin has expanded.
Figure 4:
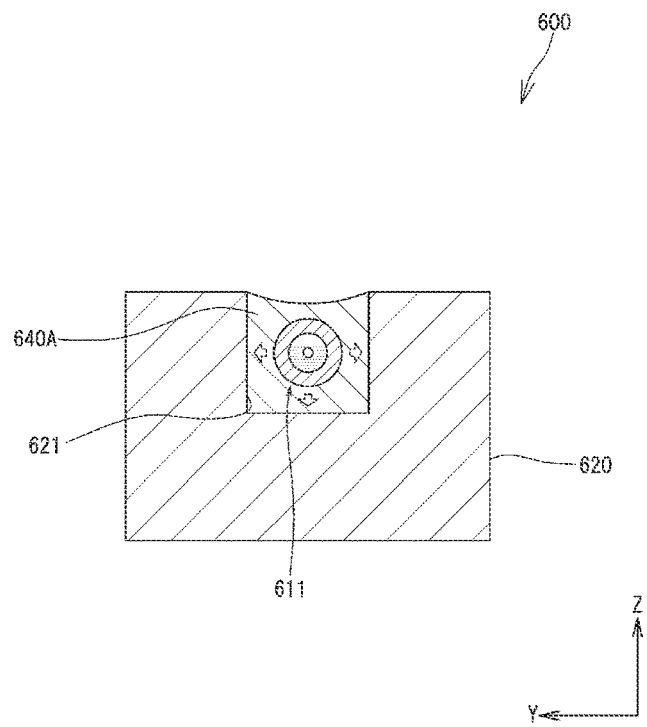
FIG. 4 is a cross-sectional view taken along line A-A of FIG. 2, schematically showing a state in which a resin has shrunk.

Embodiments of an optical fiber protection structure and an optical combiner structure using such an optical fiber protection structure according to the present invention will be described in detail below with reference to FIGS. 5 to 20B. In FIGS. 5 to 20B, the same or corresponding components are denoted by the same or corresponding reference numerals and will not be described below repetitively. Furthermore, in FIGS. 5 to 20B, the scales or dimensions of components may be exaggerated, or some components may be omitted.

Figure 5:
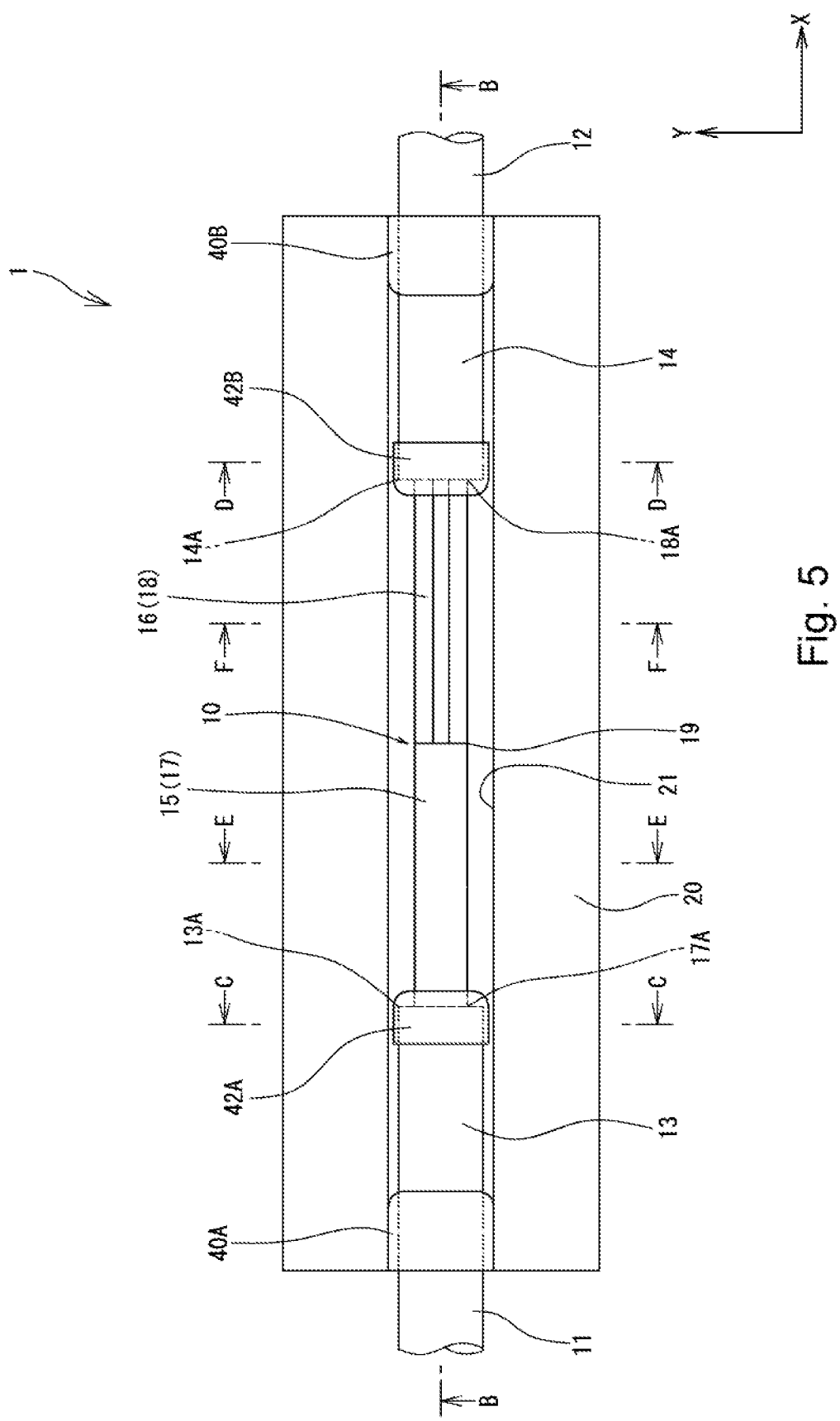
FIG. 5 is a plan view showing an optical combiner structure according to a first embodiment of the present invention.
Figure 6:
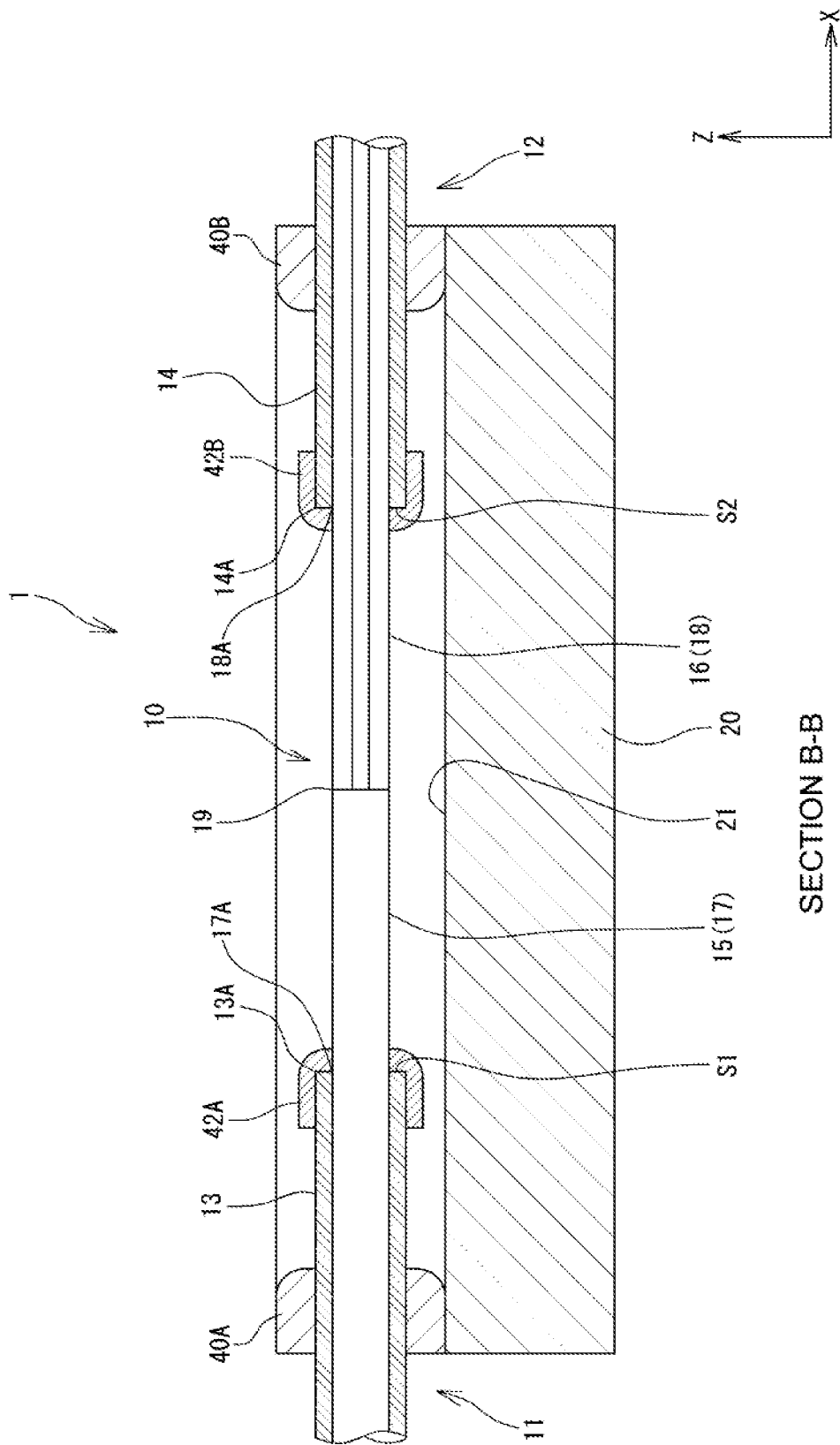
FIG. 6 is a cross-sectional view of the optical combiner structure taken along line B-B of FIG. 5.

FIG. 5 is a plan view showing an optical combiner structure 1 according to a first embodiment of the present invention, and FIG. 6 is a cross-sectional view taken along line B-B of FIG. 5. As shown in FIGS. 5 and 6, the optical combiner structure 1 includes an optical combiner 10 having optical fibers 11 and 12 connected to each other by fusion splicing and a fiber accommodation portion 20 that protects a fusion splice portion 19 between the optical fibers 11 and 12. The optical combiner 10 has a first optical fiber 11, a second optical fiber 12, and a fusion splice portion 19 at which the first optical fiber 11 and the second optical fiber 12 are connected to each other by fusion splicing. The fiber accommodation portion 20 serves to protect the optical fibers 11 and 12 and the fusion splice portion 19 from external forces, impact, and vibration.

Figure 7:
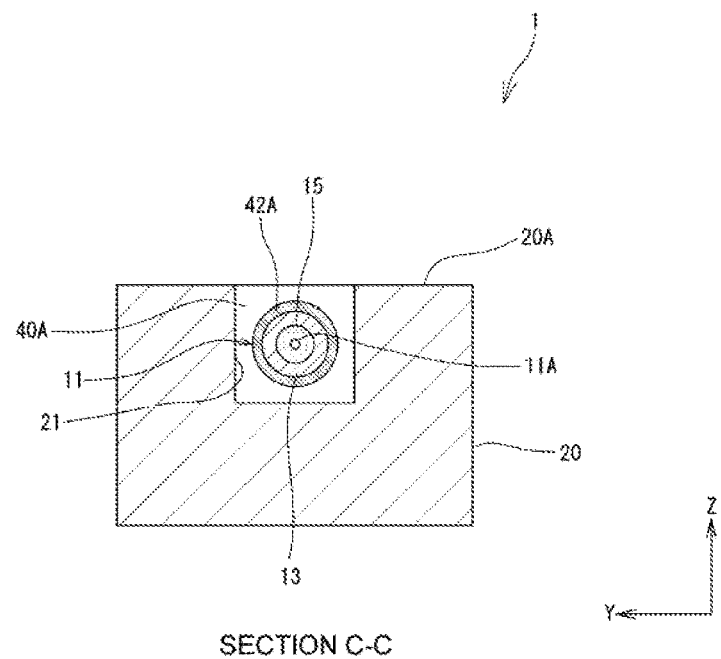
FIG. 7 is a cross-sectional view taken along line C-C of FIG. 5.
Figure 8:
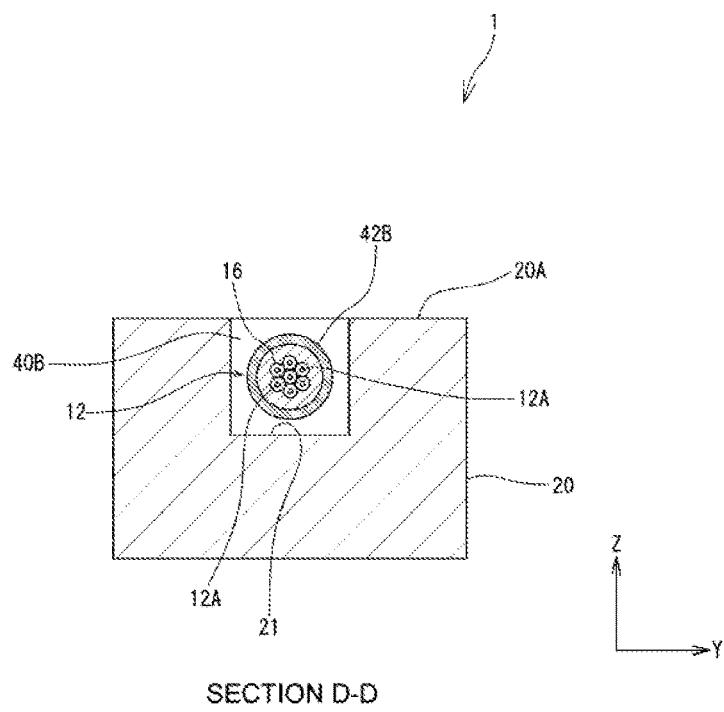
FIG. 8 is a cross-sectional view taken along line D-D of FIG. 5.

FIG. 7 is a cross-sectional view taken along line C-C of FIG. 5, and FIG. 8 is a cross-sectional view taken along line D-D of FIG. 5. As shown in FIGS. 5 to 8, the fiber accommodation portion 20 is in the form of a generally rectangular parallelepiped with a longitudinal direction along the X-direction. A fiber accommodation groove 21 extending along the X-direction is formed in an upper surface 20A of the fiber accommodation portion 20.

As shown in FIGS. 5 and 6, a covering 13 of the first optical fiber 11 is removed over a predetermined distance from an end of the first optical fiber 11. Thus, a bare fiber exposure portion 17 in which a bare fiber 15 is exposed is formed. Furthermore, a covering 14 of the second optical fiber 12 is removed over a predetermined distance from an end of the second optical fiber 12. Thus, a bare fiber exposure portion 18 in which a bare fiber 16 is exposed is formed. The bare fiber exposure portion 17 of the first optical fiber 11 and the bare fiber exposure portion 18 of the second optical fiber 12 are connected to each other at the fusion splice portion 19 by fusion splicing.

The bare fiber exposure portion 17 of the first optical fiber 11 and the bare fiber exposure portion 18 of the second optical fiber 12 are disposed within the fiber accommodation groove 21 of the fiber accommodation portion 20 in a state in which the bare fiber exposure portion 17 and the bare fiber exposure portion 18 are connected to each other at the fusion splice portion 19 by fusion splicing. With such a configuration, the fusion splice portion 19 and the bare fiber exposure portions 17 and 18 are accommodated within the fiber accommodation groove 21 of the fiber accommodation portion 20. For example, the fiber accommodation portion 20 may be formed of a glass material such as Neoceram (trademark) or quartz.

In the present embodiment, the first optical fiber 11 is formed by a single fiber having a core 11A (see FIG. 7), and the second optical fiber 12 is formed by a bundle fiber into which a plurality of optical fibers (seven optical fibers in the illustrated example) each having a core 12A are bundled (see FIG. 8). Thus, the optical combiner 10 of the present embodiment is formed as a 7×1 combiner. As a matter of course, the number of the core 11A of the first optical fiber 11 and the number of the cores 12A of the second optical fiber 12 may be changed in an appropriate manner.

As shown in FIGS. 6 and 7, the first optical fiber 11 is fixed within the fiber accommodation groove 21 by a fixation resin 40A, which is filled into a first end of the fiber accommodation groove 21 along the X-direction. As shown in FIG. 7, this fixation resin 40A surrounds the whole circumference of the covering 13 of the first optical fiber 11. Similarly, as shown in FIGS. 6 and 7, the second optical fiber 12 is fixed within the fiber accommodation groove 21 by a fixation resin 40B, which is filled into a second end of the fiber accommodation groove 21 along the X-direction. As shown in FIG. 8, this fixation resin 40B also surrounds the whole circumference of the covering 14 of the second optical fiber 12.

As described above, the bare fiber exposure portions 17 and 18 and the fusion splice portion 19 of the optical fibers 11 and 12 are accommodated within the fiber accommodation groove 21 of the fiber accommodation portion 20. Therefore, the bare fiber exposure portions 17 and 18 and the fusion splice portion 19 of the optical fibers 11 and 12, which are particularly vulnerable to external forces, are protected from external forces, impact, and vibration. Thus, the fiber accommodation portion 20 serves as a protection structure for the optical combiner 10 having the optical fibers 11 and 12 and the fusion splice portion 19.

Figure 9:
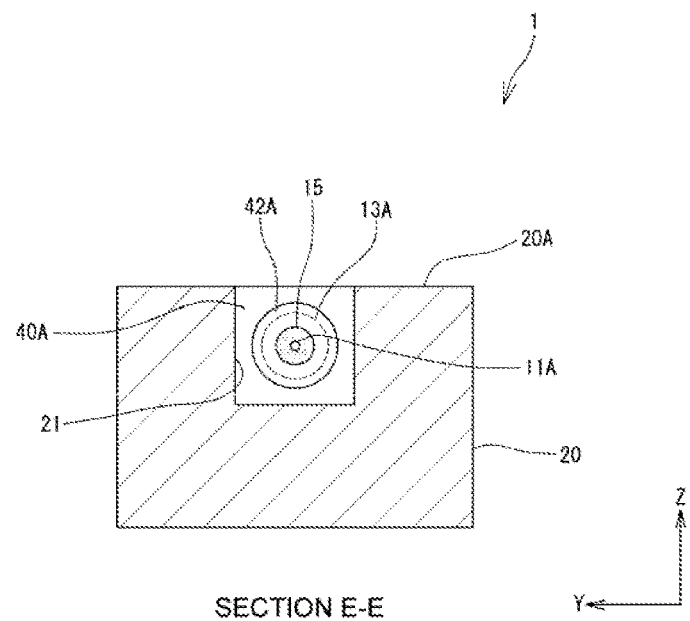
FIG. 9 is a cross-sectional view taken along line E-E of FIG. 5.

As shown in FIGS. 5 and 6, a seal resin 42A is provided near an end 17A of the bare fiber exposure portion 17 that is located on an opposite side of the fusion splice portion 19. The seal resin 42A covers a portion of the bare fiber exposure portion 17 and a portion of the covering 13. FIG. 9 is a cross-sectional view taken along line E-E of FIG. 5. As shown in FIGS. 7 and 9, the seal resin 42A covers the whole circumferences of the bare fiber 15 and the covering 13 near the end 17A. With such a configuration, a space between the bare fiber 15 and the covering 13 at the end 17A is sealed by the seal resin 42A.

Figure 10:
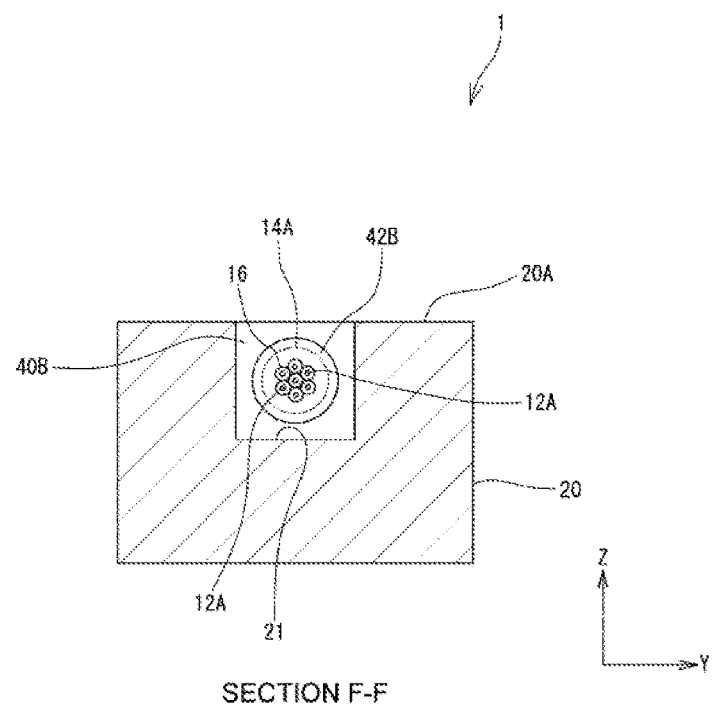
FIG. 10 is a cross-sectional view taken along line F-F of FIG. 5.

Similarly, as shown in FIGS. 5 and 6, a seal resin 42B is provided near an end 18A of the bare fiber exposure portion 18 that is located on an opposite side of the fusion splice portion 19. The seal resin 42B covers a portion of the bare fiber exposure portion 18 and a portion of the covering 14. FIG. 10 is a cross-sectional view taken along line F-F of FIG. 5. As shown in FIGS. 7 and 10, the seal resin 42B covers the whole circumferences of the bare fiber 16 and the covering 14 near the end 18A. With such a configuration, a space between the bare fiber 16 and the covering 14 at the end 18A is sealed by the seal resin 42B.

Thus, in the present embodiment, the space between the end 17A of the bare fiber exposure portion 17 and the covering 13 and the space between the end 18A of the bare fiber exposure portion 18 and the covering 14 are sealed by the seal resins 42A. Therefore, moisture is prevented from being introduced between the ends 17A, 18A and the coverings 13, 14. Accordingly, the coverings 13 and 14 are prevented from swelling due to the introduced moisture. Thus, deterioration of the optical characteristics of the optical combiner 10 is mitigated.

Referring again to FIGS. 5 and 6, the aforementioned seal resin 42A is spaced from an inner surface of the fiber accommodation groove 21. Similarly, the seal resin 42B is spaced from the inner surface of the fiber accommodation groove 21. In other words, the seal resins 42A and 42B are provided within the fiber accommodation groove 21 such that they are out of contact with the inner surface of the fiber accommodation groove 21.

With such an arrangement, even if the optical combiner structure 1 is under a high-temperature environment, the seal resins 42A and 42B can expand isotropically over a circumferential direction without any inhibition by the inner surface of the fiber accommodation groove 21. Therefore, no anisotropic stresses are applied to the seal resins 42A and 42B by the inner surface of the fiber accommodation groove 21 when the seal resins 42A and 42B expand. Accordingly, microbend is prevented from being generated at portions of the optical fibers 11 and 12 where the seal resins 42A and 42B are provided. As a result, deterioration of the optical characteristics of the optical combiner 10 is mitigated under a high-temperature environment.

As shown in FIG. 6, in the present embodiment, the seal resin 42A is provided to seal the space between the bare fiber 15 and the covering 13 at the end 17A, and the seal resin 42B is provided to seal the space between the bare fiber 16 and the covering 14 at the end 18A. A single seal resin may be provided so as to cover the entire length of the bare fiber exposure portions 17 and 18 in a state in which it is spaced from the inner surface of the fiber accommodation groove 21. This single seal resin may seal the space between the bare fiber 15 and the covering 13 at the end 17A and the space between the bare fiber 16 and the covering 14 at the end 18A.

As shown in FIG. 5, the bare fiber 15 of the first optical fiber 11 is formed so as to have such a large diameter that it is connected to all (seven) bare fibers of the second optical fiber 12. Thus, the bare fiber 15 of the first optical fiber 11 may not be subject to enormous influence of the aforementioned anisotropic stresses as compared to the small-diameter bare fibers of the second optical fiber 12. In such a case, therefore, the seal resin 42A may not necessarily be spaced from the inner surface of the fiber accommodation groove 21, and a portion of the seal resin 42A or the entire seal resin 42A may be brought into contact with the inner surface of the fiber accommodation groove 21.

It is preferable to form such seal resins 42A and 42B of a material having a refractive index lower than those of claddings in the bare fibers 15 and 16. Such a configuration can effectively prevent light propagating through the optical combiner 10 from leaking out (particularly from the vicinity of the ends 17A and 18A).

Figure 11:
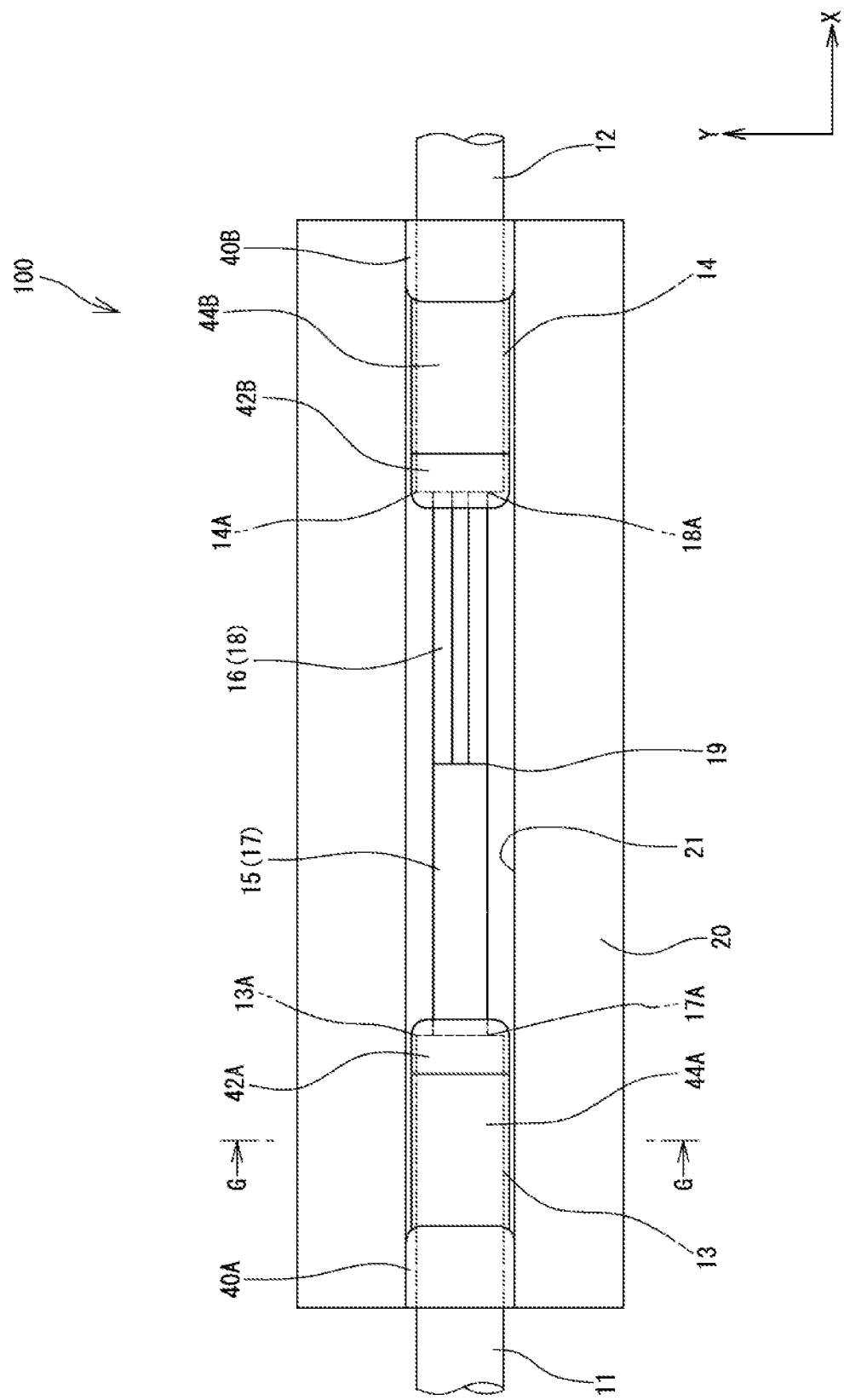
FIG. 11 is a plan view showing an optical combiner structure according to a second embodiment of the present invention.
Figure 12:
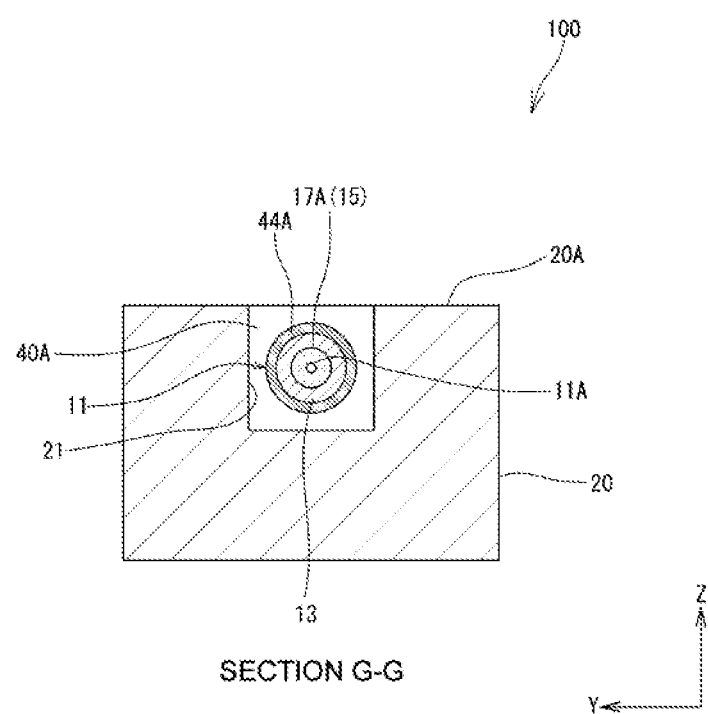
FIG. 12 is a cross-sectional view taken along line G-G of FIG. 11.

FIG. 11 is a plan view showing an optical combiner structure 100 according to a second embodiment of the present invention. FIG. 12 is a cross-sectional view of the optical combiner structure 100 taken along line G-G shown in FIG. 11. As shown in FIG. 11, the optical combiner structure 100 further includes a heat dissipation resin 44A formed between the fixation resin 40A and the seal resin 42A so as to cover an outer circumference of the covering 13 and a heat dissipation resin 44B formed between the fixation resin 40B and the seal resin 42B so as to cover an outer circumference of the covering 14. In the present embodiment, the heat dissipation resin 44A is formed such that at least a portion of the heat dissipation resin 44A is brought into contact with the fixation resin 40A and the seal resin 42A, and the heat dissipation resin 44B is formed such that at least a portion of the heat dissipation resin 44B is brought into contact with the fixation resin 40B and the seal resin 42B.

As shown in FIG. 12, the heat dissipation resin 44A is spaced from the inner surface of the fiber accommodation groove 21. Similarly, the heat dissipation resin 44B is also spaced from the inner surface of the fiber accommodation groove 21, which is not illustrated. Those heat dissipation resins 44A and 44B are formed of a material having a thermal conductivity higher than those of the claddings in the bare fibers 15 and 16 and the covering 13 and 14.

With such a configuration, heat generated by light propagating through the optical fibers 11 and 12 is dissipated to an exterior of the optical combiner structure 100 via the heat dissipation resins 44A and 44B. As a result, increase of the temperature in the optical fibers is suppressed. Furthermore, since the heat dissipation resins 44A and 44B are spaced from the inner surface of the fiber accommodation groove 21, no microbend is caused to the optical fibers 11 and 12 for the aforementioned reasons even if the heat dissipation resins 44A and 44B are under a high-temperature environment. Thus, according to the present embodiment, deterioration of the optical characteristics of the optical combiner 10 is prevented under a high-temperature environment.

Particularly, in the present embodiment, at least a portion of the heat dissipation resins 44A and 44B are formed so as to be in contact with the seal resins 42A and 42B. Therefore, heat generated in the seal resins 42A and 42B by light propagating through the optical fibers 11 and 12 is likely to be transmitted through the heat dissipation resins 44A and 44B along the axial direction. Furthermore, at least a portion of the heat dissipation resins 44A and 44B is formed so as to be in contact with the fixation resins 40A and 40B. Therefore, heat transmitted through the heat dissipation resins 44A and 44B as described above is likely to be transmitted through the fixation resins 40A and 40B to the fiber accommodation portion 20. Thus, the external heat dissipation performance is improved.

In the present embodiment, the heat dissipation resins 44A and 44B are formed so as to cover the entire regions ranging from the fixation resins 40A and 40B to the seal resins 42A and 42B. However, the heat dissipation resins 44A and 44B may be formed so as to cover a portion of those regions. Furthermore, only either one of the heat dissipation resins 44A and 44B may be provided.

Figure 13:
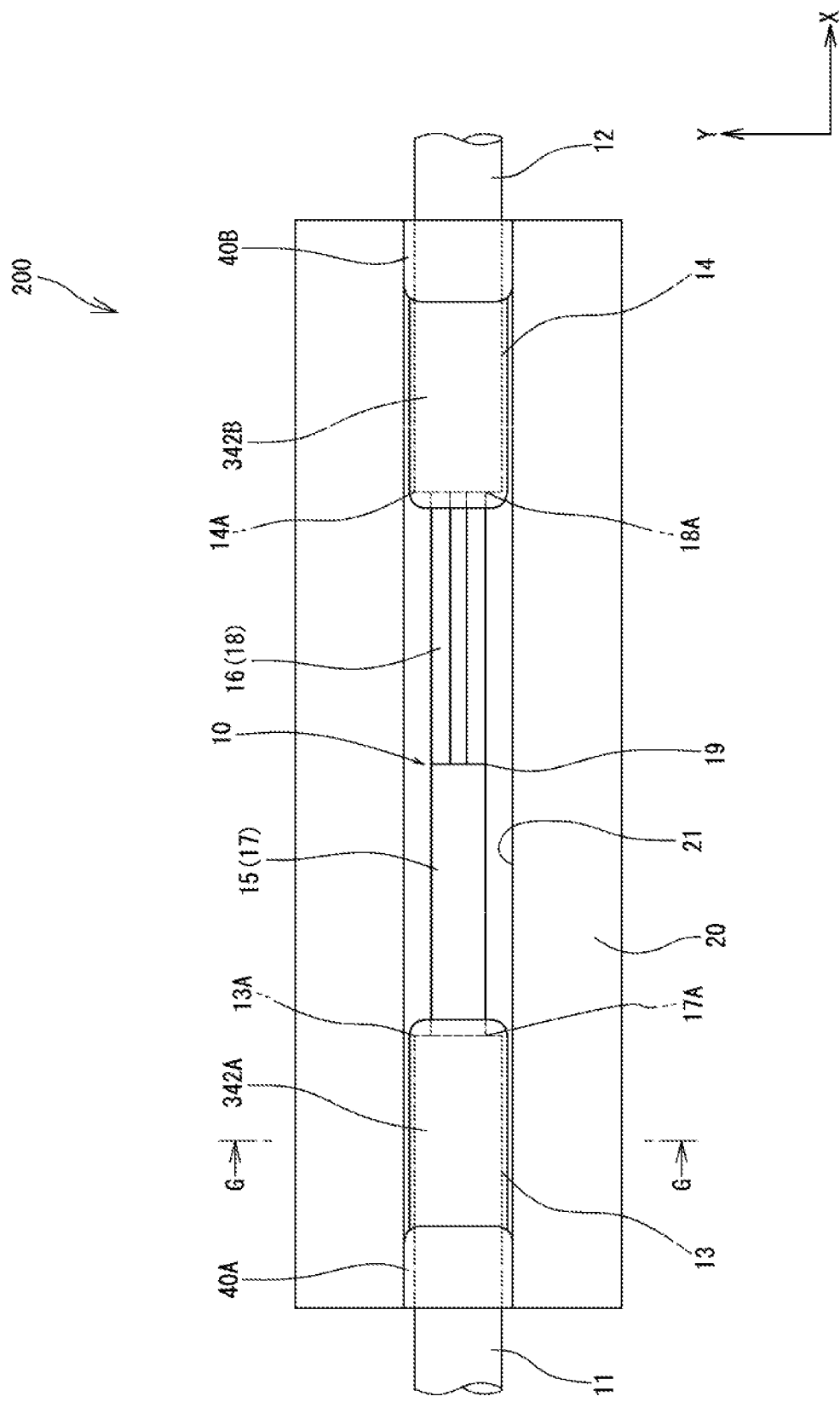
FIG. 13 is a plan view showing an optical combiner structure according to a third embodiment of the present invention.
Figure 14:
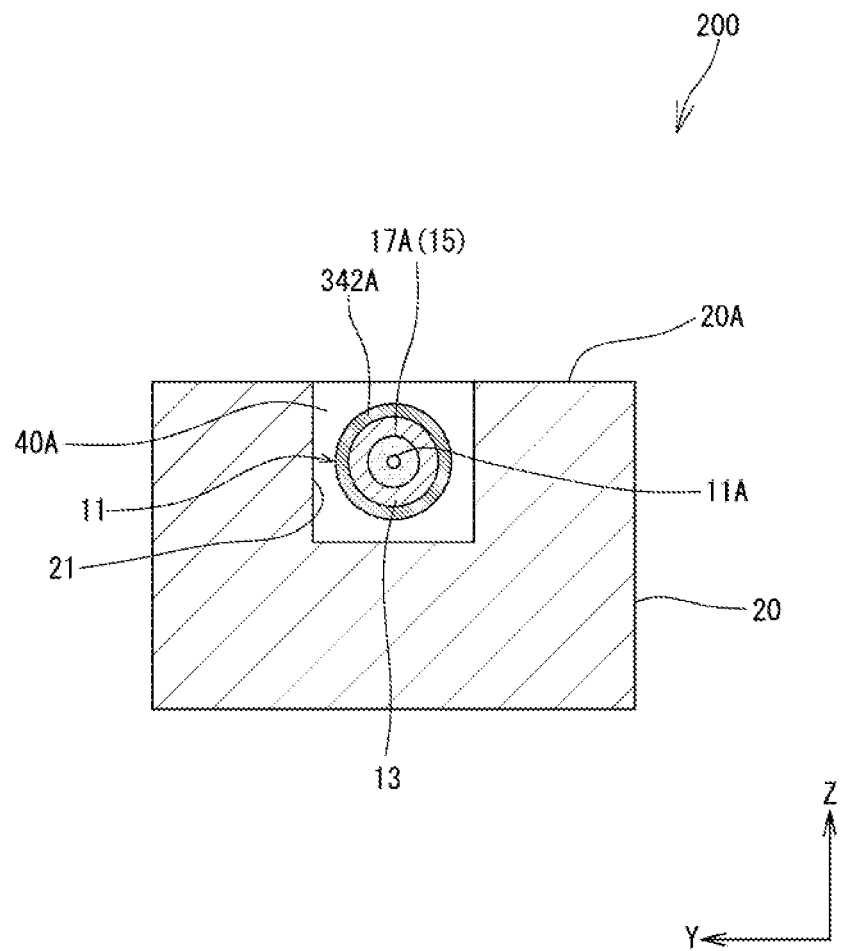
FIG. 14 is a cross-sectional view showing the optical combiner structure according to the third embodiment of the present invention, which corresponds to FIG. 12.

FIG. 13 is a plan view showing an optical combiner structure 200 according to a third embodiment of the present invention. FIG. 14 is a cross-sectional view of the optical combiner structure 200, which corresponds to FIG. 12. As shown in FIG. 13, the optical combiner structure 200 has seal resins 342A and 342B, which are formed by extending the seal resins 42A and 42B of the optical combiner structure 1 to locations where the seal resins 42A and 42B are brought into contact with the fixation resins 40A and 40B. As shown in FIG. 14, the seal resin 342A is spaced from the inner surface of the fiber accommodation groove 21. Similarly, the seal resin 342B is also spaced from the inner surface of the fiber accommodation groove 21, which is not illustrated. Those seal resins 342A and 342B are formed of a material having a thermal conductivity higher than those of the claddings in the bare fibers 15 and 16 and the coverings 13 and 14.

With such a configuration, heat generated by light propagating through the optical fibers 11 and 12 is dissipated to an exterior of the optical combiner structure 200 via the seal resins 342A and 342B. As a result, increase of the temperature in the optical fibers is suppressed. In other words, the seal resins 342A and 342B not only serve to seal a space between the bare fibers 15, 16 and the coverings 13, 14, but also serve as heat dissipation resins to dissipate heat of the optical fibers 11 and 12 to the exterior of the optical combiner structure 200 in the present embodiment. Therefore, according to the present embodiment, the seal resins and the heat dissipation resins can be formed of the same material. Accordingly, a manufacturing process can be simplified, and a manufacturing cost can be reduced. Furthermore, since the seal resins 342A and 342B are spaced from the inner surface of the fiber accommodation groove 21, no microbend is caused to the optical fibers 11 and 12 for the aforementioned reasons even if the seal resins 342A and 342B are under a high-temperature environment. Thus, according to the present embodiment, deterioration of the optical characteristics of the optical combiner 10 is prevented under a high-temperature environment.

Figure 15:
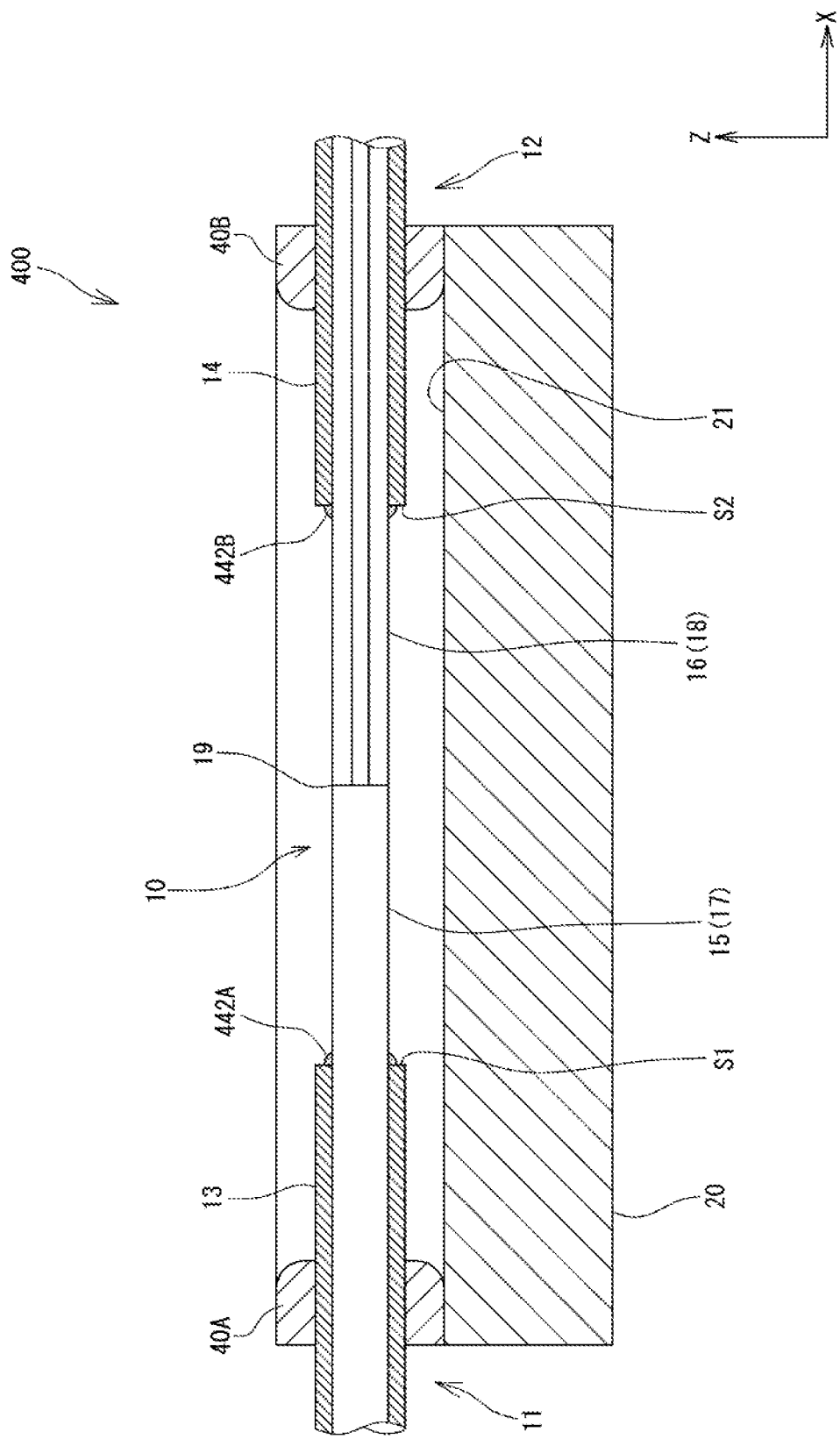
FIG. 15 is a diagram showing an optical combiner structure according to a fourth embodiment of the present invention and is a cross-sectional view corresponding to FIG. 6.

FIG. 15 is a view showing an optical combiner structure 400 according to a fourth embodiment of the present invention and is a cross-sectional view corresponding to FIG. 6. In the aforementioned other embodiments, the entire surface of the covering end face S1 formed between the end 13A of the covering 13 and the end 17A of the bare fiber exposure portion 17 and the entire surface of the covering end face 2 formed between the end 14A of the covering 14 and the end 18A of the bare fiber exposure portion 18 are covered with the seal resins 42A and 42B, respectively (see FIG. 6). Meanwhile, in the present embodiment, only a portion of the covering end faces S1 and S2 is covered with the seal resins 442A and 442B. In other words, only portions of the covering end faces S1 and S2 near the bare fibers 15 and 16 are covered with the seal resins 442A and 442B. Thus, spaces between the bare fibers 15, 16 and the coverings 13, 14 are sealed.

In this manner, the optical combiner structure 400 is configured such that the seal resins 442A and 442B*d* do not cover the entire covering end surfaces S1 and S2, but cover only a portion of the covering end surfaces S1 and S2. Therefore, the spaces between the bare fibers 15, 16 and the coverings 13, 14 can be sealed with a smaller amount of the seal resins as compared to the other embodiments. Therefore, a manufacturing cost can be reduced. The present invention may be applied to either one of the covering end faces S1 and S2.

Figure 18:
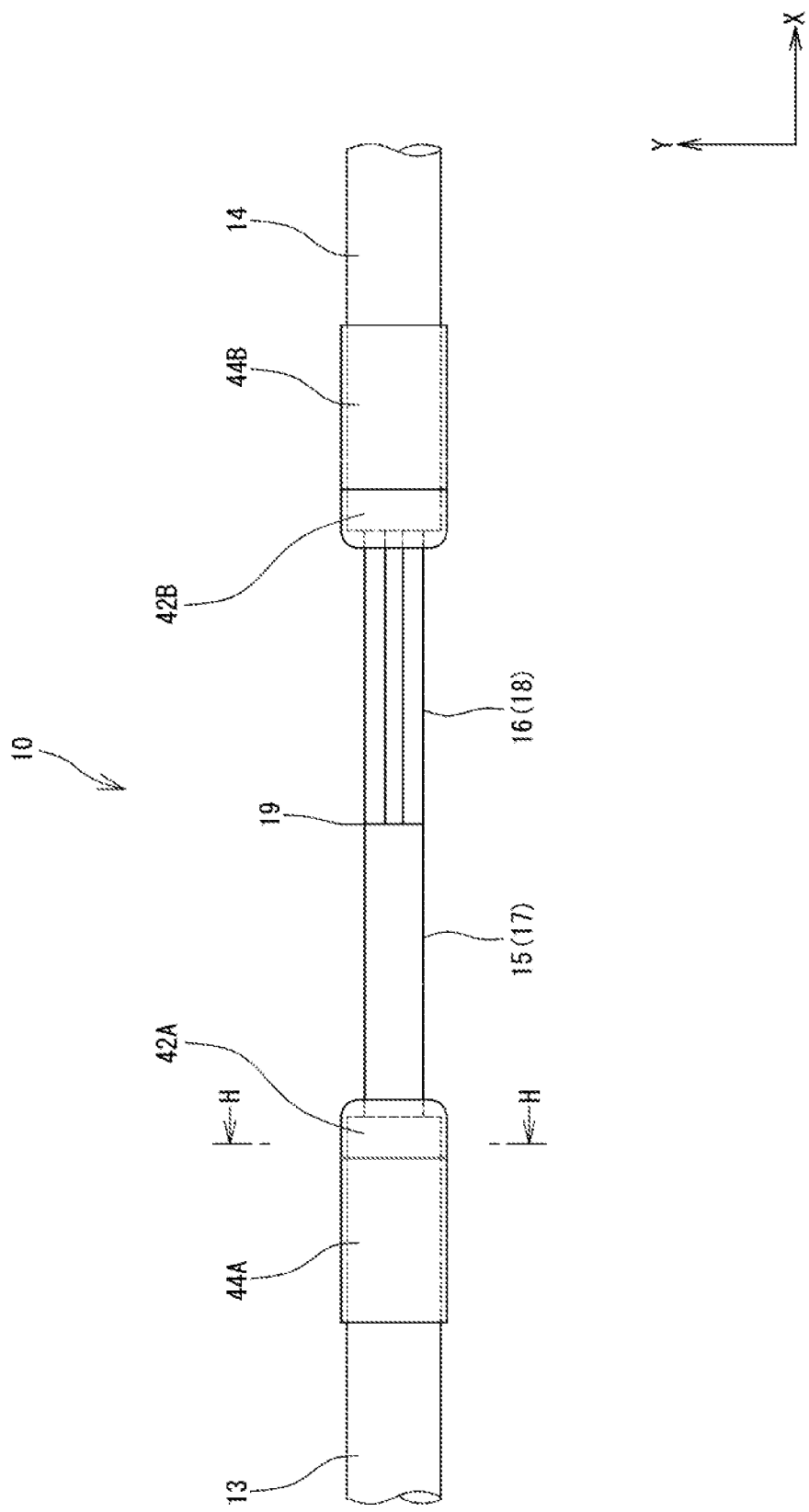
FIG. 18 is a diagram illustrating an example of a method of manufacturing the optical combiner structure according to the second embodiment of the present invention.
Figure 19:
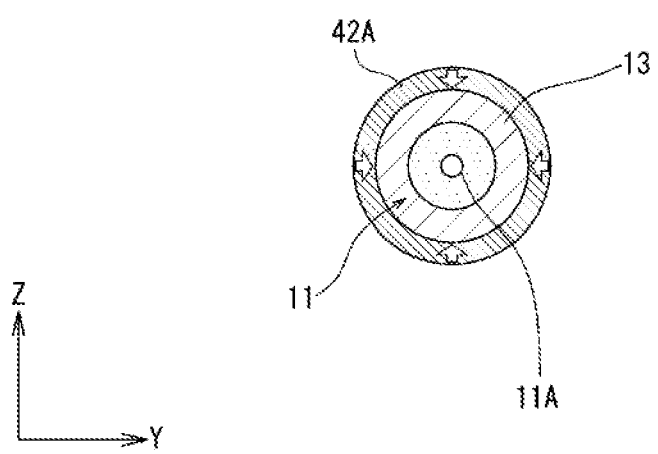
FIG. 19 is a diagram illustrating an example of a method of manufacturing the optical combiner structure according to the second embodiment of the present invention and is a cross-sectional view taken along line H-H of FIG. 18.

Next, an example of a method of manufacturing an optical combiner structure 100 according to the second embodiment of the present invention will be described with reference to FIG. 11 and FIGS. 16 to 20B. FIGS. 16, 17, 18, and 20A are plan views corresponding to FIG. 11, FIG. 19 is a cross-sectional view taken along line H-H of FIG. 18, and FIG. 20B is a cross-sectional view corresponding to FIG. 6.

Figure 16:
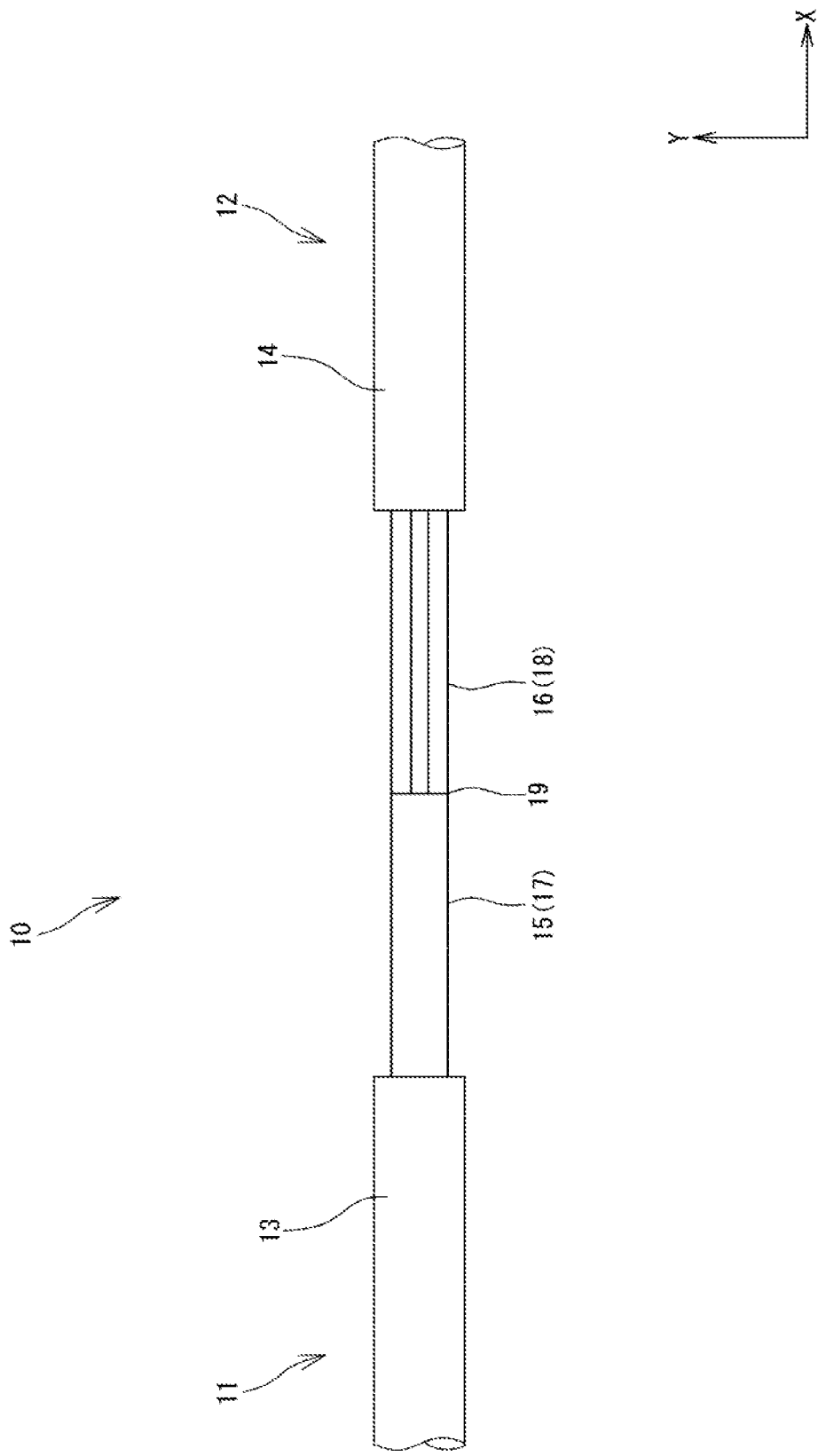
FIG. 16 is a diagram illustrating an example of a method of manufacturing an optical combiner structure according to the second embodiment of the present invention.

First, the covering 13 is peeled from an end of the first optical fiber 11 by a predetermined distance to form a bare fiber exposure portion 17. Similarly, the covering 14 is peeled from an end of the second optical fiber 12 by a predetermined distance to form a bare fiber exposure portion 18. As shown in FIG. 16, the bare fiber exposure portion 17 and the bare fiber exposure portion 18 are connected to each other by fusion splicing to form an optical combiner 10 having a fusion splice portion 19.

Figure 17:
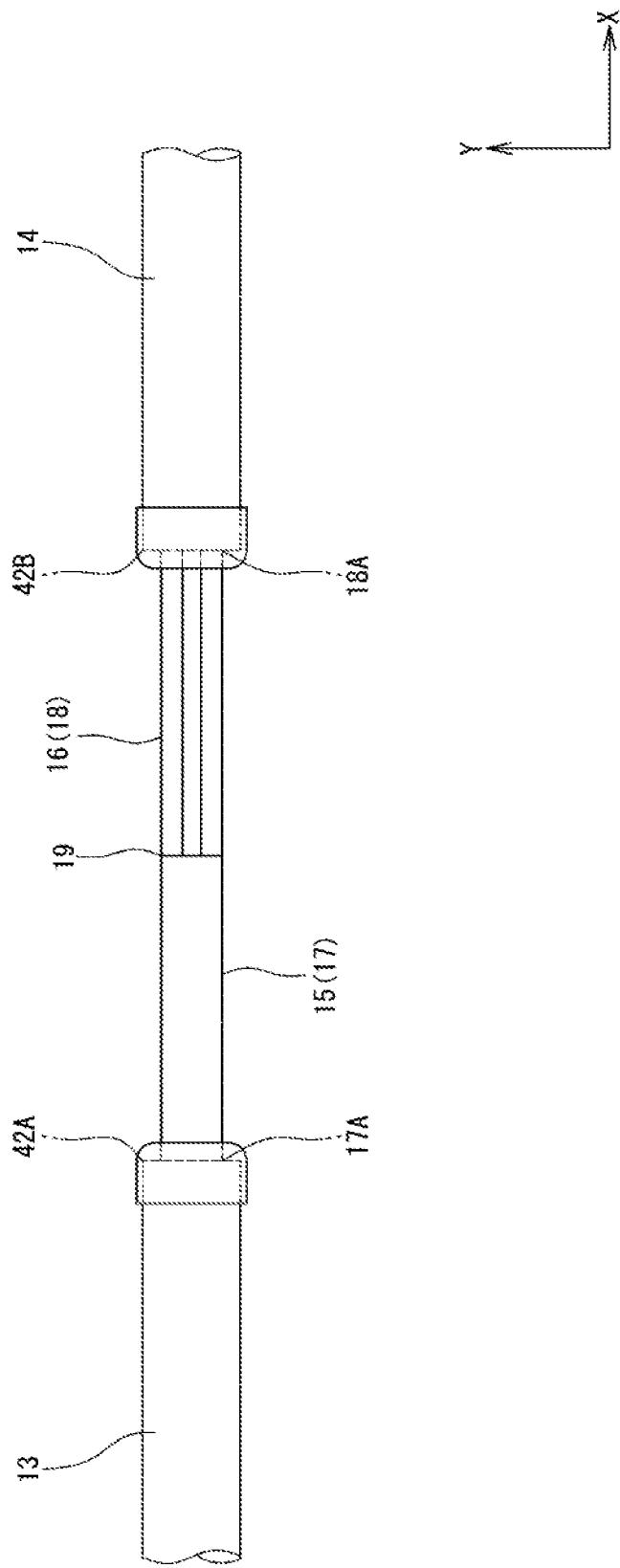
FIG. 17 is a diagram illustrating an example of a method of manufacturing the optical combiner structure according to the second embodiment of the present invention.

Then, as shown in FIG. 17, a seal resin 42A is provided near the end 17A of the bare fiber exposure portion 17 that is located at the opposite side of the fusion splice portion 19 so as to cover a portion of the bare fiber exposure portion 17 and a portion of the covering 13. At that time, the seal resin 42A is formed so as to have such a thickness that the seal resin 42A does not reach an inner surface of the fiber accommodation groove 21 of the fiber accommodation portion 20. Similarly, a seal resin 42B is provided near the end 18A of the bare fiber exposure portion 18 that is located at the opposite side of the fusion splice portion 19 so as to cover a portion of the bare fiber exposure portion 18 and a portion of the covering 14. At that time, the seal resin 42B is formed so as to have such a thickness that the seal resin 42B does not reach the inner surface of the fiber accommodation groove 21 of the fiber accommodation portion 20.

Instead of the seal resins 42A and 42B, a single seal resin may be formed so as to cover the entire length of the bare fiber exposure portions 17 and 18 with such a thickness that it does not reach the inner surface of the fiber accommodation groove 21.

Furthermore, as shown in FIG. 18, a heat dissipation resin 44A is provided on an outer circumference of the covering 13 so as to extend toward the opposite side of the fusion splice portion 19. At that time, the heat dissipation resin 44A is formed so as to have such a thickness that the heat dissipation resin 44A does not reach the inner surface of the fiber accommodation groove 21 of the fiber accommodation portion 20. The heat dissipation resin 44A may be formed so as to overlap with at least a portion of the seal resin 42A. Furthermore, the heat dissipation resin 44A may be formed so as to extend across the entire region ranging between the seal resin 42A and the fixation resin 40A. Similarly, a heat dissipation resin 44B is provided on an outer circumference of the covering 14 so as to extend toward the opposite side of the fusion splice portion 19. At that time, the heat dissipation resin 44B is formed so as to have such a thickness that the heat dissipation resin 44B does not reach the inner surface of the fiber accommodation groove 21 of the fiber accommodation portion 20. The heat dissipation resin 44B may be formed so as to overlap with at least a portion of the seal resin 42B. Furthermore, the heat dissipation resin 44B may be formed so as to extend across the entire region ranging between the seal resin 42B and the fixation resin 40B.

When no heat dissipation resins 44A and 44B are provided, for example, in a case where the optical combiner structure 1 according to the first embodiment is manufactured, the process illustrated in FIG. 18 does not need to be performed.

After the seal resins 42A and 42B and the heat dissipation resins 44A and 44B have been provided in the optical combiner 10, the seal resins 42A and 42B and the heat dissipation resins 44A and 44B are hardened. In other words, the seal resins 42A and 42B and the heat dissipation resins 44A and 44B are hardened before the optical fibers 11 and 12 are accommodated within the fiber accommodation groove 21. Thus, as shown in FIG. 19, the seal resins 42A and 42B and the heat dissipation resins 44A and 44B isotropically shrink over the circumferential direction. Accordingly, microbend is prevented from being generated at portions where the seal resins 42A and 42B and the heat dissipation resins 44A and 44B have been provided in the optical fibers 11 and 12.

Figure 20A:
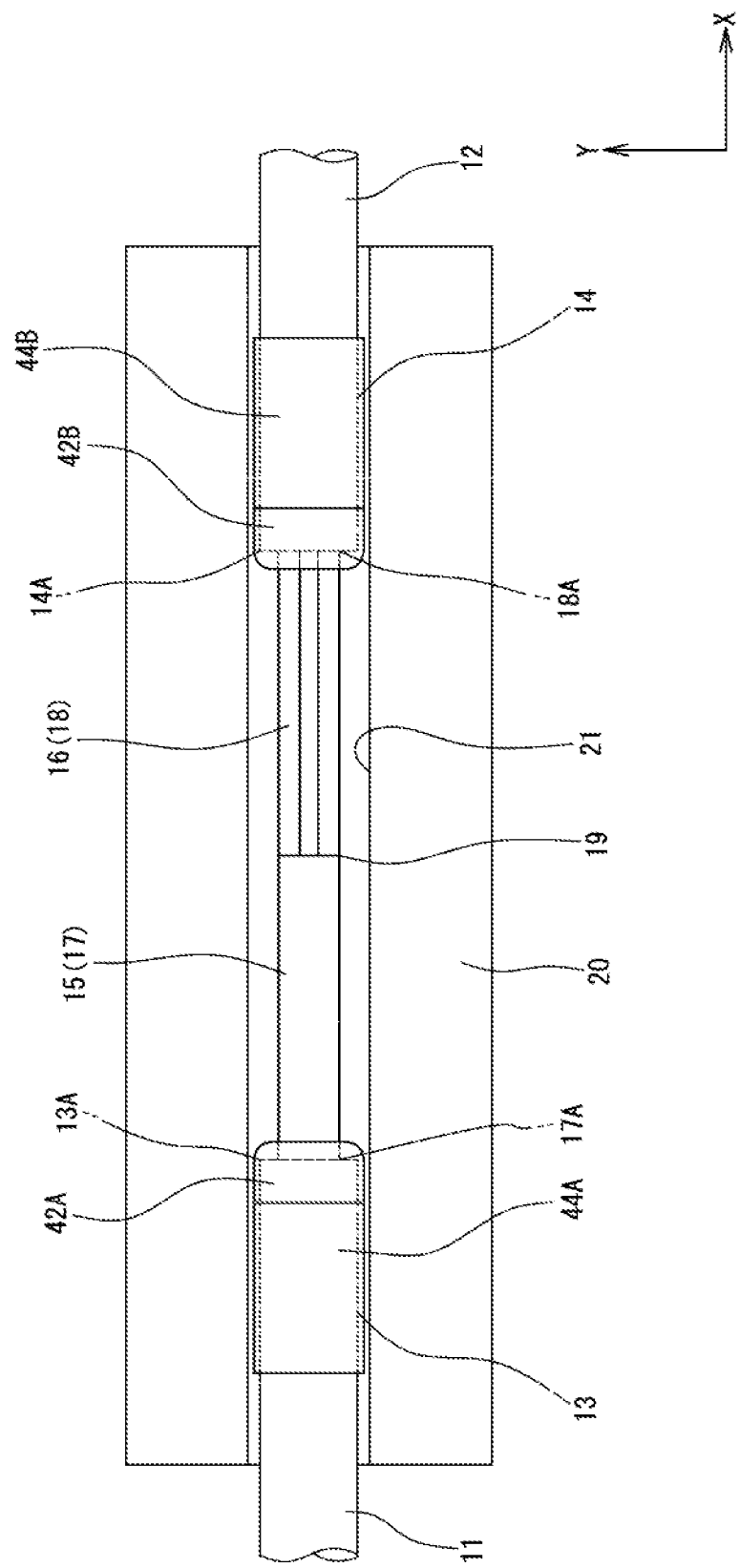
FIG. 20A is a diagram illustrating an example of a method of manufacturing the optical combiner structure according to the second embodiment of the present invention.
Figure 20B:
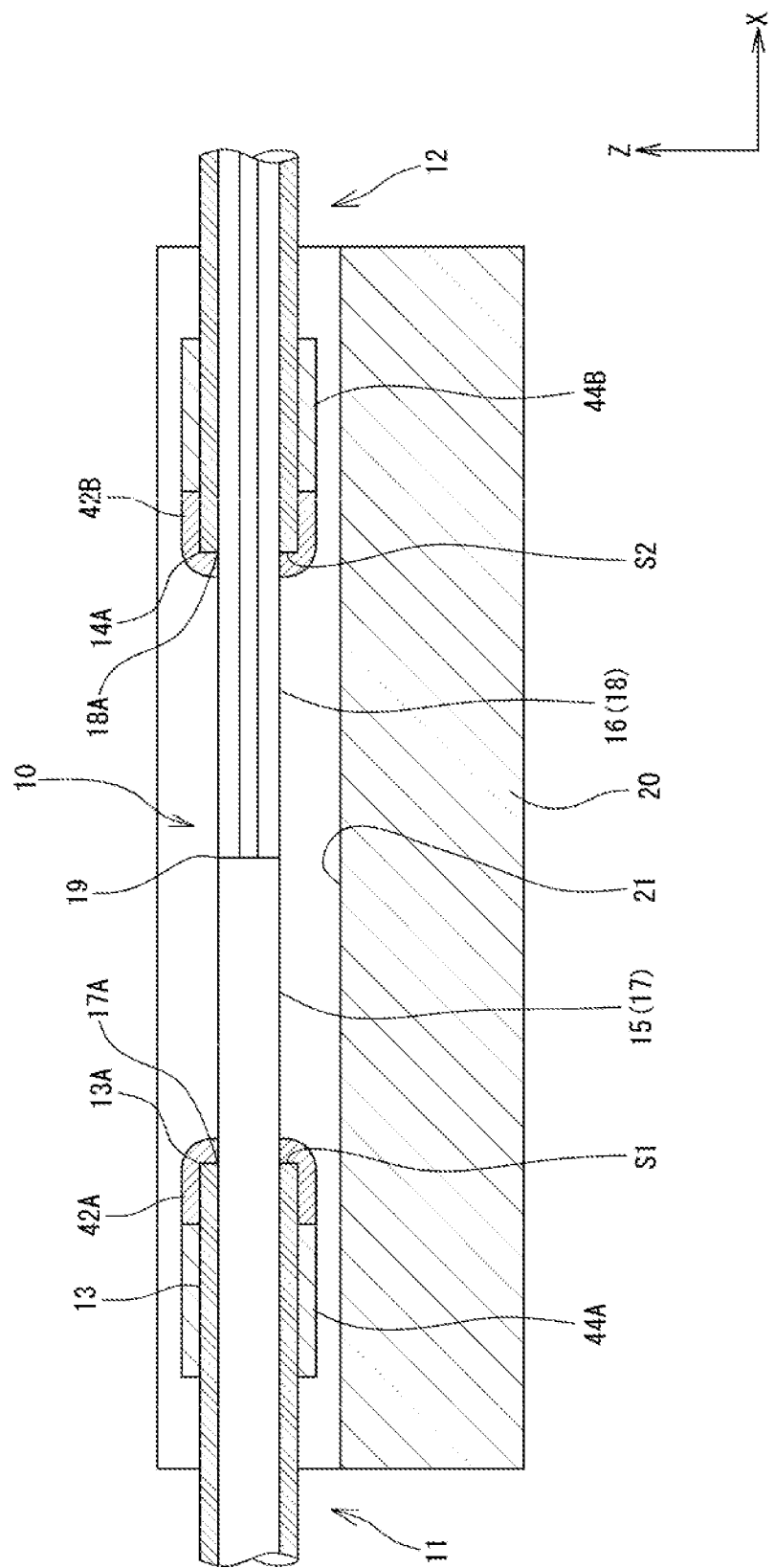
FIG. 20B is a diagram illustrating an example of a method of manufacturing the optical combiner structure according to the second embodiment of the present invention and is a cross-sectional view corresponding to FIG. 6.

After the seal resins 42A and 42B and the heat dissipation resins 44A and 44B have been hardened, as shown in FIGS. 20A and 20B, the optical fibers 11 and 12 are received into the fiber accommodation groove 21 such that the seal resins 42A and 42B and the heat dissipation resins 44A and 44B are spaced from the inner surface of the fiber accommodation groove 21. The optical fibers 11 and 12 are held in the accommodated locations. While the seal resins 42A and 42B and the heat dissipation resins 44A and 44B are held in such a state in which they are spaced from the inner surface of the fiber accommodation groove 21, fixation resins 40A and 40B are filled into both ends of the fiber accommodation groove 21. Thus, the optical fibers 11 and 12 (the optical combiner 10) are fixed in the fiber accommodation groove 21. In this manner, an optical combiner structure 100 is completed (see FIG. 11). At that time, the fixation resins 40A and 40B may be formed so as to overlap with at least a portion of the heat dissipation resins 44A and 44B.

As described above, according to the present manufacturing method, the seal resins 42A and 42B and the heat dissipation resins 44A and 44B are hardened before the optical fibers 11 and 12 are received into the fiber accommodation groove 21. That is, according to the present manufacturing method, the seal resins 42A and 42B and the heat dissipation resins 44A and 44B can be hardened so that they shrink isotropically over the circumferential direction. Accordingly, anisotropic stresses are prevented from being applied to the optical fibers 11 and 12 by those resins. Therefore, even if the seal resins 42A and 42B and the heat dissipation resins 44A and 44B are formed of a material having a high rate of cure shrinkage, microbend is prevented from being generated at portions where those resins are provided (see FIG. 19). As a result, a material having a low refractive index can be selected as a material for the seal resins 42A and 42B. As described above, according to the present manufacturing method, generation of microbend is prevented even if the seal resins are formed of a material having a low refractive index. Accordingly, deterioration of the optical characteristics of the optical combiner structure is mitigated during the manufacturing process, and an optical combiner structure having excellent optical characteristics can be provided.

As described above, the bare fiber 15 of the first optical fiber 11 is formed so as to have such a large diameter that it is connected to all (seven) bare fibers of the second optical fiber 12. Thus, the bare fiber 15 of the first optical fiber 11 may not be subject to enormous influence of the aforementioned anisotropic stresses as compared to the small-diameter bare fibers of the second optical fiber 12. In such a case, therefore, the seal resin 42A may not need to be formed so as to have such a thickness that it does not reach the inner surface of the fiber accommodation groove 21, and the seal resin 42A may be formed so as to have such a thickness that a portion of the seal resin 42A or the entire seal resin 42A is brought into contact with the inner surface of the fiber accommodation groove 21.

The terms "left," "right," "up," "down," "lower," and "upper," and other positional terms used herein are used in connection with the illustrated embodiments and may be varied depending on the relative positional relationship between components of the apparatus.

Although some preferred embodiments of the present invention have been described, the present invention is not limited to the aforementioned embodiments. It should be understood that various different forms may be applied to the present invention within the technical idea thereof.

The aforementioned embodiments exemplarily describe an optical combiner structure using an optical fiber protection structure according to the present invention and a method of manufacturing such an optical combiner structure. As a matter of course, however, an optical fiber protection structure according to the present invention is applicable to any optical element other than an optical combiner and a method of manufacturing such an optical element.

INDUSTRIAL APPLICABILITY

The present invention is suitably used for an optical fiber protection structure that accommodates at least a portion of an optical fiber therein.

DESCRIPTION OF REFERENCE NUMERALS AND SIGNS 1, 100, 200, 400 Optical combiner structure
10 Optical combiner
11 First optical fiber
11A, 12A Core
12 Second optical fiber
13, 14 Covering
13A, 14A, 17A, 18A End
15, 16 Bare fiber
17, 18 Bare fiber exposure portion
19 Fusion splice portion
20 Fiber accommodation portion
21 Fiber accommodation groove
20A Upper surface
40A, 40B Fixation resin
42A, 42B, 342A, 342B, 442A, 442B Seal resin
44A, 44B Heat dissipation resin
S1, S2 Covering end face

The invention claimed is:

1. An optical fiber protection structure for protecting a bare fiber exposure portion of at least one optical fiber having a bare fiber and a covering which covers the bare fiber, a portion of the covering being removed from the at least one optical fiber so as to form the bare fiber exposure portion, the optical fiber protection structure comprising:
a fiber accommodation portion having a fiber accommodation groove that receives the bare fiber exposure portion therein;
a fixation resin filled within the fiber accommodation groove for fixing a portion of the covering within the fiber accommodation groove; and
two seal resins for sealing a space between the bare fiber and the covering on both ends of the bare fiber exposure portion,
wherein at least one of the two seal resins is formed so as to be spaced from an inner surface of the fiber accommodation groove.

2. The optical fiber protection structure as recited in claim 1, wherein the seal resin has a refractive index lower than that of a cladding in the bare fiber.

3. The optical fiber protection structure as recited in claim 1, wherein the seal resin has a thermal conductivity higher than those of a cladding in the bare fiber and the covering.

4. The optical fiber protection structure as recited in claim 1, further comprising a heat dissipation resin having a thermal conductivity higher than those of a cladding in the bare fiber and the covering, the heat dissipation resin covering an outer circumference of the covering located within the fiber accommodation groove,
wherein the heat dissipation resin is formed so as to be spaced from the inner surface of the fiber accommodation groove.

5. The optical fiber protection structure as recited in claim 4, wherein at least a portion of the heat dissipation resin is in contact with the seal resin.

6. The optical fiber protection structure as recited in claim 4, wherein at least a portion of the heat dissipation resin is in contact with the fixation resin.

7. The optical fiber protection structure as recited in claim 1, wherein the covering directly contacts an outer surface of the bare fiber.

8. An optical fiber protection structure for protecting a bare fiber exposure portion of at least one optical fiber having a bare fiber and a covering which covers the bare fiber, a portion of the covering being removed from the at least one optical fiber so as to form the bare fiber exposure portion, the optical fiber protection structure comprising:
a fiber accommodation portion having a fiber accommodation groove that receives the bare fiber exposure portion therein;
a fixation resin filled within the fiber accommodation groove for fixing a portion of the covering within the fiber accommodation groove; and
a single seal resin for sealing a space between the bare fiber and the covering on both ends of the bare fiber exposure portion, the single seal resin being formed so as to be spaced from an inner surface of the fiber accommodation groove.

9. The optical fiber protection structure as recited in claim 8, wherein the seal resin has a refractive index lower than that of a cladding in the bare fiber.

10. The optical fiber protection structure as recited in claim 8, wherein the seal resin has a thermal conductivity higher than those of a cladding in the bare fiber and the covering.

11. The optical fiber protection structure as recited in claim 8, further comprising a heat dissipation resin having a thermal conductivity higher than those of a cladding in the bare fiber and the covering, the heat dissipation resin covering an outer circumference of the covering located within the fiber accommodation groove,
wherein the heat dissipation resin is formed so as to be spaced from the inner surface of the fiber accommodation groove.

12. The optical fiber protection structure as recited in claim 11, wherein at least a portion of the heat dissipation resin is in contact with the seal resin.

13. The optical fiber protection structure as recited in claim 11, wherein at least a portion of the heat dissipation resin is in contact with the fixation resin.

14. A method of manufacturing an optical element using an optical fiber protection structure for protecting a bare fiber exposure portion of at least one optical fiber having a bare fiber and a covering which covers the bare fiber, the method comprising:
removing a portion of the covering from the at least one optical fiber so as to form the bare fiber exposure portion;
forming two seal resins on both ends of the bare fiber exposure portion to seal a space between the bare fiber and the covering such that at least one of the two seal resins has such a thickness so as not to reach an inner surface of a fiber accommodation groove formed in a fiber accommodation portion when the bare fiber exposure portion is accommodated within the fiber accommodation groove;
after the forming the two seal resins, accommodating the bare fiber exposure portion within the fiber accommodation groove of the fiber accommodation portion such that the at least one of the two seal resins is spaced from the inner surface of the fiber accommodation groove; and
filling a fixation resin into the fiber accommodation groove to fix a portion of the covering accommodated in the fiber accommodation groove to the fiber accommodation groove.

15. The method of manufacturing an optical element as recited in claim 14, further comprising, before the accommodating the bare fiber exposure portion within the fiber accommodation groove, forming on an outer circumference of the covering a heat dissipation resin having a thermal conductivity higher than those of a cladding in the bare fiber and the covering such that the heat dissipation resin has such a thickness so as not to reach the inner surface of the fiber accommodation groove when the bare fiber exposure portion is accommodated within the fiber accommodation groove,
wherein the accommodating the bare fiber exposure portion within the fiber accommodation groove comprises accommodating the bare fiber exposure portion within the fiber accommodation groove such that the seal resin and the heat dissipation resin are spaced from the inner surface of the fiber accommodation groove.

16. A method of manufacturing an optical element using an optical fiber protection structure for protecting a bare fiber exposure portion of at least one optical fiber having a bare fiber and a covering which covers the bare fiber, the method comprising:
removing a portion of the covering from the at least one optical fiber so as to form the bare fiber exposure portion;
forming a single seal resin to seal a space between the bare fiber and the covering on both ends of the bare fiber exposure portion such that the single seal resin has such a thickness so as not to reach an inner surface of a fiber accommodation groove formed in a fiber accommodation portion when the bare fiber exposure portion is accommodated within the fiber accommodation groove;
after the forming the single seal resin, accommodating the bare fiber exposure portion within the fiber accommodation groove of the fiber accommodation portion such that the single seal resin is spaced from the inner surface of the fiber accommodation groove; and
filling a fixation resin into the fiber accommodation groove to fix a portion of the covering accommodated in the fiber accommodation groove to the fiber accommodation groove.

17. The method of manufacturing an optical element as recited in claim 16, further comprising, before the accommodating the bare fiber exposure portion within the fiber accommodation groove, forming on an outer circumference of the covering a heat dissipation resin having a thermal conductivity higher than those of a cladding in the bare fiber and the covering such that the heat dissipation resin has such a thickness so as not to reach the inner surface of the fiber accommodation groove when the bare fiber exposure portion is accommodated within the fiber accommodation groove,
wherein the accommodating the bare fiber exposure portion within the fiber accommodation groove comprises accommodating the bare fiber exposure portion within the fiber accommodation groove such that the seal resin and the heat dissipation resin are spaced from the inner surface of the fiber accommodation groove.

* * * * *